United States Patent
Noda et al.

(10) Patent No.: US 6,188,916 B1
(45) Date of Patent: Feb. 13, 2001

(54) COMMUNICATION SYSTEM OF PORTABLE COMMUNICATION TERMINAL, INCOMING CALL CONTROL SYSTEM OF PORTABLE COMMUNICATION TERMINAL AND INCOMING CALL NOTIFYING DEVICE OF PORTABLE COMMUNICATION TERMINAL

(75) Inventors: Masanobu Noda; Kenichi Yoshimura; Kazuhiro Iwabuchi; Syuji Nakagaki; Takaaki Sasaki, all of Kitami; Akihiko Uchino, Yokohama; Masayuki Saito, Yokohama; Kouji Nakazato, Yokohama, all of (JP)

(73) Assignee: Kyocera Corporation, Kyoto (JP)

( * ) Notice: Under 35 U.S.C. 154(b), the term of this patent shall be extended for 0 days.

(21) Appl. No.: 08/952,542
(22) PCT Filed: Dec. 26, 1996
(86) PCT No.: PCT/JP96/03830
  § 371 Date: Nov. 20, 1997
  § 102(e) Date: Nov. 20, 1997
(87) PCT Pub. No.: WO97/36448
  PCT Pub. Date: Oct. 2, 1997

(30) Foreign Application Priority Data

Mar. 22, 1996 (JP) .................................................. 8-066131
Mar. 26, 1996 (JP) .................................................. 8-070005
Mar. 26, 1996 (JP) .................................................. 8-070006
Mar. 28, 1996 (JP) .................................................. 8-073891
Jul. 10, 1996 (JP) .................................................. 8-199681
Jul. 26, 1996 (JP) .................................................. 8-008204
Jul. 26, 1996 (JP) .................................................. 8-008205
Jul. 26, 1996 (JP) .................................................. 8-008206
Jul. 26, 1996 (JP) .................................................. 8-008207
Sep. 27, 1996 (JP) .................................................. 8-010596

(51) Int. Cl.[7] ................................................ H04B 7/212
(52) U.S. Cl. ........................ 455/567; 455/426; 370/337
(58) Field of Search .................................... 370/336, 337, 370/345, 347, 442, 311, 313, 318, 350; 455/567, 426, 403

(56) References Cited

U.S. PATENT DOCUMENTS

| 5,651,052 | * | 7/1997 | Serrano | 455/567 |
| 5,838,673 | * | 11/1998 | Ritz et al. | 370/336 |
| 5,848,362 | * | 12/1998 | Yamashita | 455/567 |
| 5,867,796 | * | 2/1999 | Inutsuka | 455/567 |
| 5,878,354 | * | 3/1999 | Hasegawa | 455/567 |
| 5,960,367 | * | 9/1999 | Kita | 455/567 |

* cited by examiner

Primary Examiner—Chi H. Pham
Assistant Examiner—Brenda H. Pham
(74) Attorney, Agent, or Firm—Hogan & Hartson, LLP

(57) ABSTRACT

The malfunction of a vibrator as a drawback of a conventional independent vibrator type portable terminal is obviated. A communication system of a portable communication terminal comprises a portable communication terminal capable of movably communicating with another communication terminal via radio communication with a base station, and peripheral equipment which performs a predetermined operation via radio communication with the portable communication terminal. The portable communication terminal transmits a radio signal to the peripheral equipment by using a time division multiplex access system for exchanging signals by putting data on a time slot as the radio communication between the portable communication terminal and the peripheral equipment and using the time slot in a time zone excluding other time zones in which the portable communication terminal is transmitting a radio signal to the base station. Thus the radio wave transmitted from the portable communication terminal to the peripheral equipment is prevented from being jammed by the radio wave transmitted from the portable communication terminal to the base station.

22 Claims, 18 Drawing Sheets

BIT SYNC. DATA   WORD SYNC. DATA   ID INFORMATION   OPERATION MODE   PARITY

COMMUNICATION SYSTEM OF PORTABLE COMMUNICATION TERMINAL, INCOMING CALL CONTROL SYSTEM OF PORTABLE COMMUNICATION TERMINAL AND INCOMING CALL NOTIFYING DEVICE OF PORTABLE COMMUNICATION TERMINAL

TECHNICAL FIELD

The present invention relates to a communication system of a portable communication terminal, an incoming call control system of a portable communication terminal and an incoming call notifying device of a portable communication terminal between the portable communication terminal (portable telephone) such as a cellular radio telephone and a PHS (personal handyphone system), and peripheral equipment such as an incoming call device (vibrator) for notifying the user about the incoming call.

BACKGROUND ART

A typical conventional portable telephone is adapted to notify the user about an incoming call by sound (ringing tone) and another type of portable telephone is designed to notify the user about an incoming call additionally by vibrating a built-in vibrator of a portable telephone body in order to prevent a nuisance from being cause to those around the user due to the generation of noise. Although this type of portable telephone is certainly able to eliminate the noise caused by the ringing tone, the disadvantage is that when the portable telephone is put into a bag or a pocket of a suit jacket that has been taken off, it is not possible to notify the user about an incoming call.

Therefore, a so-called independent vibrator type portable telephone has been proposed in that the user is notified of an incoming call by causing a small vibrator which is provided separately from the portable telephone body to vibrate when the incoming call is received. The vibration of the separated vibrator is generated by rotating a motor as a vibration source intermittently for a predetermined time when the portable telephone body detects the incoming call and instructs the vibrator to vibrate; that is, the whole vibrator is then vibrated to notify the user about the incoming call and subsequently its operation is stopped.

With the independent vibrator type portable telephone like this, the user is supposed to keep carrying the vibrator about the body so that the user may sense the vibration of the vibrator with the skin, whereby even though the portable telephone is put in a bag or placed somewhere separately from the body, the user is certainly notified of the incoming call.

The aforementioned independent vibrator type portable telephone is designed to transmit a radio wave W2 from the portable telephone to the vibrator in addition to a radio wave W1 from the portable telephone to a base station. The radio wave W2 is transmitted as a command signal from the portable telephone to the vibrator when an incoming call is received by the portable telephone from the base station, whereby the vibrator starts vibrating to notify the user about the incoming call.

While the radio wave W2 is being transmitted from the portable telephone to the vibrator, however, if the radio wave W1 is simultaneously transmitted from the portable telephone to the base station, the radio wave W1 directed to the base station may interfere with the radio wave W2 directed to the vibrator in a portion where both the radio waves are superimposed as shown in FIG. 25 because the radio wave W1 is stronger than the radio wave W2. Therefore, the command signal fails to reach the vibrator and no vibration is generated therefrom, whereupon the user is not notified of the incoming call.

In the case of such a portable telephone as mentioned above, the vibrator detects a radio wave for use in transmitting an ST (control tone) signal or a DST (digital control tone) signal to the base station through a voice channel and vibrates itself until the user sets the portable telephone off hook against an incoming call from the base station.

Since the vibrator keeps detecting the transmission wave sent out by the portable telephone in the prior art method, however, it may detect a radio wave in the neighborhood of 900 MHz sent out by anything other than the portable telephone. Therefore, the vibrator may start vibrating as it misjudges that an incoming call is received by itself though no incoming call is received by the portable telephone.

In addition to the problem above, there is another one arising from a case where the vibrator starts vibrating though no incoming call is received by the proper portable telephone because the vibrator detects the radio wave sent out by a portable telephone carried by a person other than the owner of the vibrator.

In the case of a small portable receiver such as a pager, a loop antenna as described in Postexamined Japanese Patent Publication 53-30977/(1978) is employed. FIG. 26 shows a conventional loop antenna.

As shown in FIG. 26, the surface of a grounded board 834 intersects the open face of a loop antenna 832 and as shown in FIG. 27, the open face of the loop antenna 832 is disposed in a direction perpendicular to the tangent of the side face 838 of the human body at the time the portable receiver is fitted thereto (e.g., put into a pocket). Further, a tuning capacitive capacitor 835 is juxtaposed between one end portion 832a of the loop antenna 832 and the grounded board 834. The other end portion 832b of the loop antenna 832 and the grounded board 834 are short-circuited and the loop antenna 832 is supplied with power from a tap feeding part 837.

The loop antenna 832 is hardly affected by the human body since the loop antenna 832 is arranged so that the side face 838 of the human body and the loop face are set perpendicular to each other by making most of the advantage of a magnetic-field type antenna. When the grounded board 834 is considered as a criterion, the tap feeding part 837 simultaneously has the factor of a monopole antenna which is top-loaded with the loop antenna 832 and also operates as an electromagnetic type antenna. Since magnetic-field and electromagnetic-field type polarized wave faces intersects in view of the construction of the loop antenna 832, the portable receiver is capable of dealing with both the vertical-horizontal polarized waves.

However, the loop of the loop antenna 832 has to be wound on the grounded board 834 perpendicularly and when the loop antenna 832 is adopted in the small portable receiver, the open area of the loop is hardly enlarged. Therefore, its gain deteriorates and consequently the drawback is that the malfunction of the receiver is incurred.

Since the loop is designed to be wound across the grounded board 834, parts on the grounded board 834 tend to be badly affected when they are installed close to one another and the drawback is that the malfunction of the receiver due to gain deterioration and characteristic variations at the time mass production (variations in the positional relation between each part and the loop at the time of assembly) are brought about.

An object of the present invention is to provide a communication system of a portable communication terminal, an incoming call control system of a portable communication terminal and an incoming call notifying device of a portable communication terminal capable of obviating the malfunction of a vibrator as the drawback of a conventional independent vibrator type portable terminal.

SUMMARY OF THE INVENTION

A communication system of a portable communication terminal according to the present invention comprises a portable communication terminal capable of movably communicating with another communication terminal via radio communication with a base station, and peripheral equipment which performs a predetermined operation via radio communication with the portable communication terminal, wherein the portable communication terminal transmits a radio signal to the peripheral equipment by using a time division multiplex access system for exchanging signals by putting data on a time slot as the radio communication between the portable communication terminal and the peripheral equipment and using the time slot in a time zone excluding other time zones in which the portable communication terminal is transmitting a radio signal to the base station.

Thus since not only the time division multiplex access system for exchanging signals by putting data on a time slot as the radio communication between the portable communication terminal and the peripheral equipment but also the time slot in a time zone excluding other time zones in which the portable communication terminal is transmitting a radio signal to the base station is used, whereby even when a radio wave is transmitted from the portable communication terminal to the base station, the radio wave from the portable communication terminal to the peripheral equipment is prevented from being jammed by the former radio wave.

An incoming call control system of a portable communication terminal according to the present invention comprises a portable communication terminal body and an incoming call device for notifying the portable communication terminal body about an incoming call, wherein the portable communication terminal body is provided with a transmission unit of a special incoming call device capable of transmitting a radio wave other than a normally predetermined transmission wave; the radio wave is used to transmit an ID code from the portable communication terminal body to the incoming call device to compare the ID code with an ID code on the incoming call device side; and the portable communication terminal is notified of an incoming call only when the ID code transmitted from the portable communication terminal body conforms to the ID code on the incoming call device side.

Thus the portable communication terminal functions as what is able to transmit to the portable communication terminal a radio wave other than the normally predetermined transmission wave of the portable terminal; the radio wave is used to transmit a selective code (ID) from the portable terminal to a vibrator; the vibrator demodulates the radio wave received to decode the code transmitted from the portable terminal so as to compare the transmitted code with its own code (ID); and the vibrator starts vibrating only when both codes conform to each other, whereby it is possible to build up a system free from reacting with a radio wave sent from any portable terminal other than the aforementioned portable terminal and with any incoming call received by any portable terminal other than the portable terminal of the owner of the vibrator.

An incoming call control system of a portable communication terminal according to the present invention wherein when an incoming call is received by a portable communication terminal, an ID signal is transmitted from the portable communication terminal via radio to an incoming call notifying device; and the incoming call notifying device performs an incoming call notifying operation after the portable communication terminal detects the ID signal, and wherein a data format of the ID signal transmitted from the portable communication terminal to the incoming call notifying device has a bit synchronizing frame for use in clock regeneration on the incoming call notifying device side, a word synchronizing frame for use in frame synchronization for the acquisition of ID information, and an ID information frame for loading ID information on the portable communication terminal side.

Thus the incoming call notifying operation is performed after the incoming call notifying device detects the ID signal by transmitting the ID signal from the portable communication terminal via radio to the incoming call notifying device when an incoming call is received by the portable communication terminal, whereby a radio wave other than the radio wave of the portable communication terminal is prevented from being detected to ensure that the incoming call notifying operation is performed by detecting only the incoming call directed to its own portable communication terminal and that the malfunction of the incoming call notifying device is prevented. Further, the clock regeneration is effected on the incoming call notifying device side by the bit synchronizing frame that the data format of the ID signal has and the frame synchronization for the acquisition of the ID information is effected by the word synchronizing frame. The ID information on the portable communication terminal side is made readably by the ID information frame to ensure that the malfunction of the incoming call notifying device is prevented by using the ID signal.

An incoming call control system of a portable communication terminal according to the present invention wherein when an incoming call is received by a portable communication terminal, an ID signal is transmitted from the portable communication terminal via radio to an incoming call notifying device; and the incoming call notifying device performs an incoming call notifying operation after the portable communication terminal detects the ID signal, and wherein weak radio waves in the frequency range of 250 MHz to 322 MHz are used for the ID signal.

Thus when an incoming call is received by the portable communication terminal, an ID signal is transmitted from the portable communication terminal via radio to the incoming call notifying device, and the incoming call notifying device performs the incoming call notifying operation after the portable communication terminal detects the ID signal, whereby a radio wave other than the radio wave of the portable communication terminal is prevented from being detected to ensure that the incoming call notifying operation is performed by detecting only the incoming call directed to its own portable communication terminal and that the malfunction of the incoming call notifying device is prevented. Further, the use of weak radio waves in the frequency range of 250 MHz to 322 MHz for the ID signal results in increasing an area of notification of an incoming call to the user, thus improving convenience to the user and making it favorable to make the incoming call notifying device compact.

An incoming call notifying device of a portable communication terminal according to the present invention wherein when an incoming call is received by a portable communication terminal, an ID signal is transmitted from the portable communication terminal via radio to the incoming call notifying device; and the incoming call notifying device performs an incoming call notifying operation after the incoming call notifying device detect the ID signal on receipt of the ID signal intermittently, wherein the incoming call notifying device is provided with a received data detection unit for detecting a digital data on receipt of a radio wave from the portable communication terminal, a control unit for comparing the ID data detected by the received data detection unit with the data prestored in a memory so as to control the incoming call notifying device on the basis of results of comparison and identifying the data detected by the received data detection unit stepwise before controlling the incoming call notifying device, a timer for outputting a transfer signal for switching the received data detection unit from a sleep mode to an operating mode in a predetermined cycle and wherein when the timer outputs the transfer signal, the control unit switches the received data detection unit from the sleep mode to the operating mode and identifies the data detected by the received data detection unit stepwise and when the data needs not detection, the control unit returns the received data detection unit to the sleep mode from the operating mode.

Thus the control unit identifies the data detected by the received data detection unit steptwise and when the detecting operation by the received data detection unit is unnecessary any longer, returns the received data detection unit to the sleep mode from the operating mode as quick as possible in according with the step concerned, whereby when the signal detected by the received data detection unit is not proper one, the useless detecting operation of the received data detection unit is shortened by returning the received data detection unit to the sleep mode to the operating mode immediately after the mismatching above is found so as to reduce power consumption further.

An incoming call notifying device of a portable communication terminal according to the present invention wherein when an incoming call is received by a portable communication terminal, an ID signal is transmitted from the portable communication terminal via radio to the data reception unit of the incoming call notifying device; and the incoming call notifying device performs an incoming call notifying operation after detection of the ID signal, and wherein an antenna for use is such that the open face of a loop and the surface of a grounded board are set parallel to each other; the open area of the loop is set equal to or greater than the area of the grounded board; and the distance between the loop and the grounded board is set not less than $1/40$ of the wavelength.

Thus the open area of the loop is made larger than an open area in a case where a loop is conventionally disposed in a direction perpendicular to a grounded board since the open face of the loop and the surface of the grounded board are set parallel to each other and the open area of the loop is set equal to or greater than the area of the grounded board. Since the distance between the loop and the grounded board is set not less than $1/40$ of the wavelength, the loop does not intersect the grounded board unlike the conventional vibrator and besides since the loop is isolated from parts on the board, gain deterioration and variations in the characteristics at the time of mass production can be prevented.

DESCRIPTION OF THE PREFERRED EMBODIMENTS

A description will subsequently be given of an embodiment of the present invention by reference to the accompanying drawings.

Figure 1:
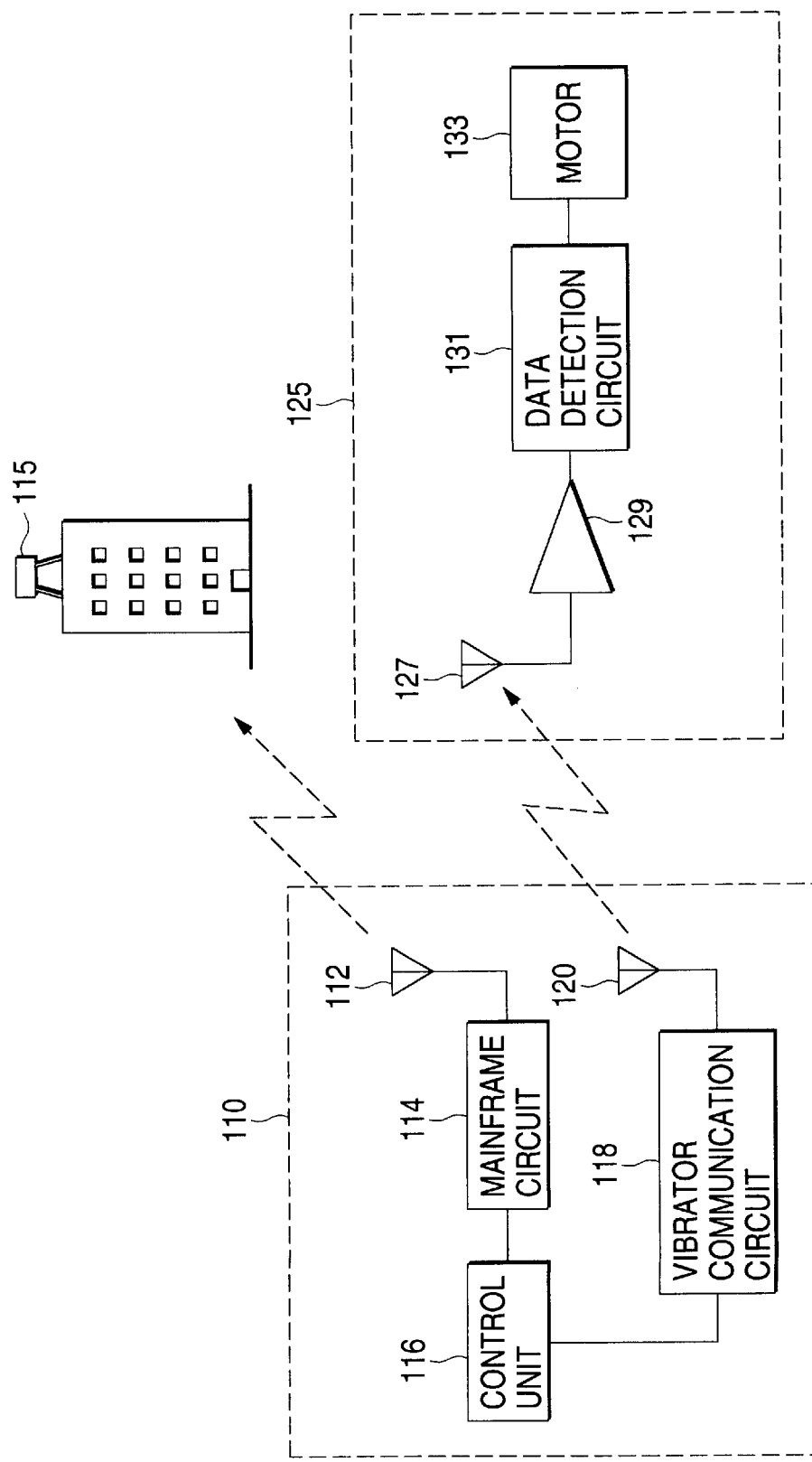
FIG. 1 is a circuit diagram of a portable telephone and a vibrator constituting a portable communication terminal system.

FIG. 1 is a diagram illustrating a portable communication terminal system to which the present invention is applied.

As shown in FIG. 1, a portable telephone 110 (portable communication terminal) has an antenna 112 for carrying out communication with a base station 115 via radio, a mainframe circuit 114 for modulating the signal transmitted from the base station 115 via the antenna 112 connected thereto, and a control unit 116 for causing the portable telephone 110 to perform its communication functions by controlling the respective parts of the portable telephone 110, the control unit 116 being connected to the mainframe circuit 114.

Although the portable telephone 110 above is similar to any ordinary one to the extent mentioned above, it has an additional remote control function for driving a vibrator 125 as its peripheral equipment via radio. More specifically, a vibrator communication circuit 118 is connected to the control unit 116 and so controlled by the control unit 116 as to transmit the signal subjected to high-frequency amplification from a remote control antenna 120 via radio to the vibrator 125.

Upon receipt of a radio wave from the remote control antenna 120 of the portable telephone 110 via a remote control antenna 127, the vibrator 125 subjects the transmitted signal to high-frequency amplification using a high-frequency amplifier circuit 129 and interprets the signal detected by a data detection circuit 131, which starts the rotation of a motor 133 as a drive source for performing the operation of vibrating the vibrator 125.

With the portable telephone 110 and the vibrator 125 thus arranged, the portable telephone 110 notifies the vibrator 125 about an incoming call via radio from the base station 115 when the portable telephone 110 decides that it has received the call from the base station 115 over the radio. With this decision, the vibrator 125 makes itself vibrate by rotating the motor 133 so as to notify the user about the incoming call. It is therefore ensured that the user is notified of the incoming call even when the portable telephone 110 is put in a bag or placed somewhere separately from the body.

In the case of such a portable telephone 110, a time division multiplex access (TDMA) system for exchanging signals by putting an amount of data on a time slot is employed for radio communication with the base station 115 and with the vibrator 125.

Figure 2:
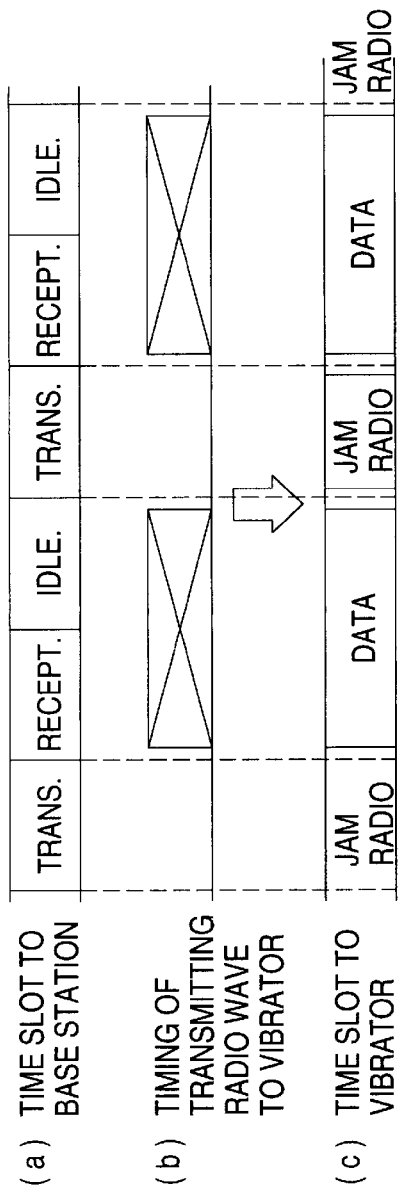
FIG. 2 is a diagram illustrating a time slot and a transmission timing explanatory of the operation of the portable telephone and the vibrator.

FIG. 2 is a diagram illustrating a communication system according to the present invention. In FIG. 2, (a) shows a time slot at the time a signal is transmitted to the base station 115; (b) the timing of sending a radio wave to the vibrator 125; and (c) a time slot at a time a signal is transmitted to the vibrator 125. During the time slot of FIG. 2(a), there are provided "idle" time zones which are different from any one of the time zone of "transmission" from the portable telephone 110 to the base station 115, the time zone of "reception" from the base station 115 to the portable telephone 110, "transmission" and "reception."

Since a radio wave W1 for use in the "transmission" from the portable telephone 110 to the base station 115 is strong, the radio wave W1 interferes with a radio wave W2 for use in the "transmission" to the base station 115 because the latter is weak. Therefore, the timing of sending the radio wave to the vibrator 125 is such that as shown by rectangles each with two diagonal lines, the time zones excluding the time zone of the "transmission" of the radio wave W1 to the base station 115, that is, the "reception" time zone from the base station 115 and the "idle" time zone are utilized.

Consequently, the time slot of FIG. 2(c) during which a signal is transmitted to the vibrator 125 contains a radio-wave W1 disturbing wave only in the "transmission" time zone from the portable telephone 110 to the base station 115, whereas a data signal is transmitted from the portable telephone 110 to the vibrator 125 at the timing of transmitting the radio wave of FIG. 2(b), whereby data from the portable telephone 110 is properly interpreted by the vibrator 125 without the interference by the radio wave W1 directed to the base station 115. The vibrator 125 then performs the vibrating operation on the basis of the data thus interpreted to ensure that it notifies the user about the incoming call received by the portable telephone 110.

The timing manipulation like this is performed on the basis of a control program using the timing issued from a clock (not shown) while the control unit 116 of the portable telephone 110 keeps controlling the mainframe circuit 114 and the vibrator communication circuit 118.

Figure 3:
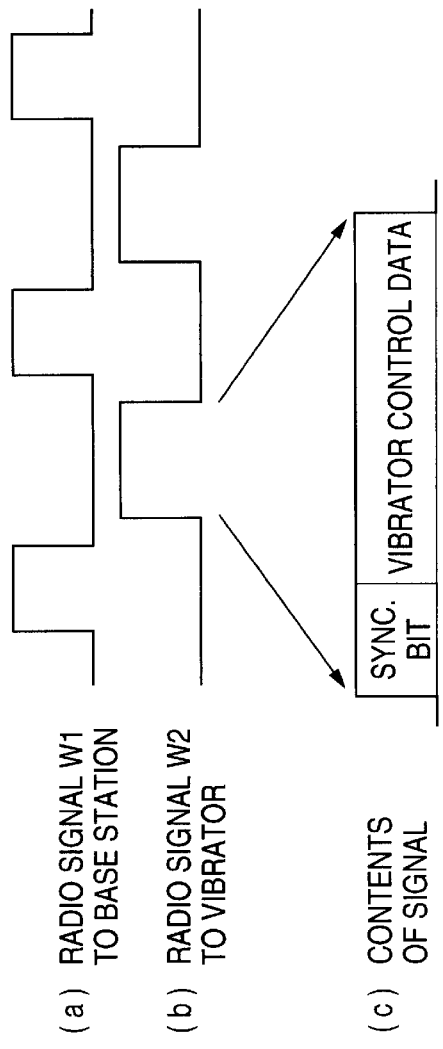
FIG. 3 is a waveform chart showing a radio wave transmitted from the portable telephone.

FIG. 3 shows pulse waveforms of the radio waves W1 and W2 transmitted from the portable telephone 110; as the radio waves W1 and W2 are shifted from each other in timing, the radio wave W1 is prevented from interfering with the radio wave W2. The contents of the signal from the portable telephone 110 to the vibrator 125 include as shown in FIG. 3(c), a synchronizing bit and vibrator control data. Therefore, the data detection circuit 131 of the vibrator 125 is started by the synchronizing bit so as to detect the control data.

Figure 4:
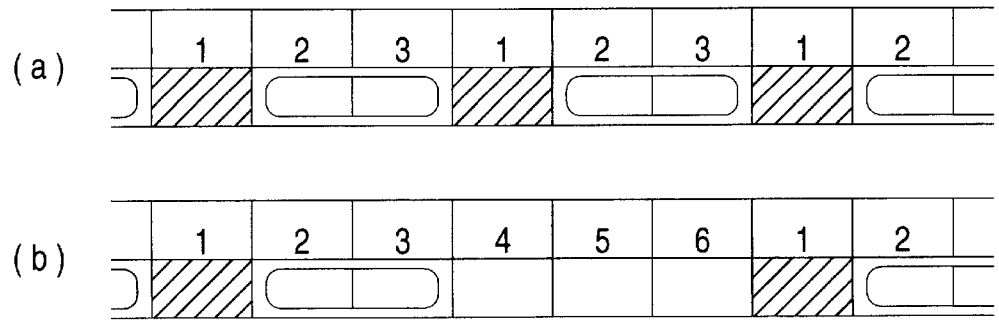
FIG. 4 shows time slots transmitted from the portable telephone and the vibrator: (a) a full-rate mode time slot; and (b) a half-rate mode time slot.

FIG. 4 shows another communication system according to the present invention. Radio communication with the vibrator 125 in some kinds of portable telephones 110 has a full-rate mode using a time slot of communication timing shown in FIG. 4(a) and a half-rate mode using a time slot of communication timing shown in FIG. 4(b); in this case, the full-rate mode may be switched over to the half-rate mode and vice versa or only either one may be used.

In the full-rate mode of communication timing shown in FIG. 4(a), the data put on any one of the time zones 1, 2 and 3 is repeatedly sent out, whereas in the half-rate mode shown in FIG. 4(b), the data put on any one of the time zones 1–6 is repeatedly sent out. Since the time zone 1 in FIG. 4 is a time zone wherein the strong radio wave W1 is being transmitted from the portable telephone 110 to the base station 115, the radio wave W1 is prevented from interfering with the radio wave W2 by using the remaining time zones 2, 3 for the transmission of data to the vibrator 125.

In the half-rate mode of communication timing shown in FIG. 4(b), the combination of time zones 4, 5 or that of time zones 5, 6 may be used for the transmission of data to the vibrator 125. Even in the full-rate mode of communication timing shown in FIG. 4(a) or the half-rate mode thereof, the data reception becomes possible without letting the portable telephone 110 make a judgment on whether to use the half- or full-rate mode on the part of the vibrator 125 by equalizing the data length intended for the vibrator 125.

Although a description has been given of a case where only a vibration command signal is transmitted from the portable telephone 110 to the vibrator 125 in the above embodiment of the invention, the vibrator 125 may be vibrated only when it identifies an ID signal with the ID signal stored therein, the former ID signal being what is transmitted together with the vibration command signal from the portable telephone 110. In this case, an incoming call for any other portable telephone is prevented from being notified by the vibrator by mistake.

Although the vibrator 125 for notifying the user about the incoming call has been used as peripheral equipment in the above embodiment of the invention, the present invention is also applicable to any other peripheral equipment having other functions.

As described above, the time division multiplex access system for exchanging signals by superimposing data on the time slot is used for the radio communication between the portable communication terminal and the peripheral equipment in accordance with the communication system of the portable communication terminal shown in FIGS. 1–4. Since the time slot in the time zones excluding the time zone wherein the portable communication terminal is transmitting the radio signal to the base station is used to transmit the radio signal from the portable communication terminal to the peripheral equipment, the radio wave transmitted from the portable communication terminal to the peripheral equipment is prevented from being jammed by the radio wave transmitted from the portable communication terminal to the base station.

Further, the quality of the signal and data directed to the peripheral equipment can be improved, irrespective of whether the portable communication terminal is in a busy or on standby mode.

Since the vibrator 125 is used as the peripheral equipment to notify the user about the incoming call in the above embodiment of the invention, that is, the user is notified of the incoming call by vibrating the vibrator 125 when the incoming call is received by the portable telephone 110, it is ensured that the user is notified of the incoming call received by the portable telephone 110 even when the portable telephone 110 is put in a bag or placed somewhere separately from the body.

Since the data length with respect to the vibrator 125 is equalized, irrespective of whether the portable telephone 110 is in the half- or full-rate mode, data reception is possible without distinguishing between the half- and full-rate modes of the portable telephone 110 on the part of the vibrator 125. It is therefore unnecessary to replace the vibrator 125 with a different one depending on whether the time slot is in the half- or full-rate mode.

Moreover, an incoming call for any other portable telephone is prevented from being notified by the vibrator 125 by mistake as the ID signal together with the vibration command signal is transmitted from the portable telephone 110 to the vibrator 125.

A description will subsequently be given of an incoming call control system for the portable communication terminal adapted for transmitting the ID signal by reference to FIGS. 5–9.

Figure 5:
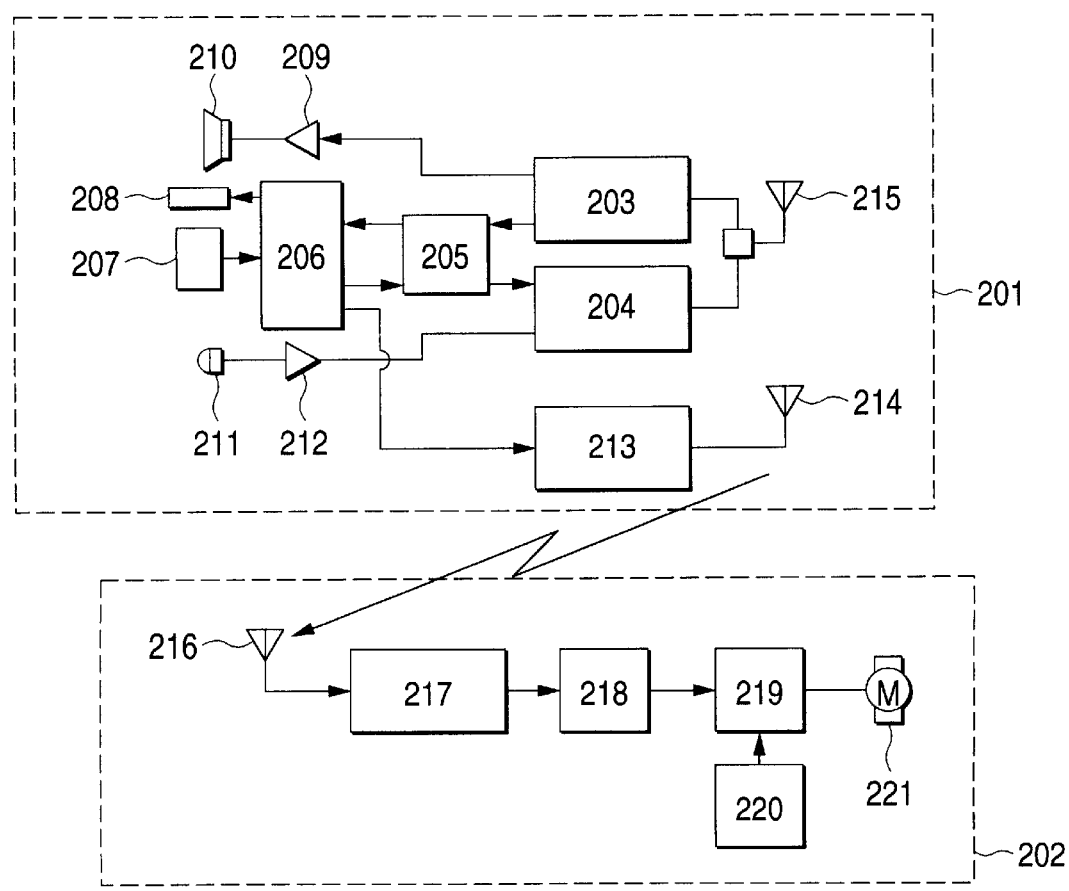
FIG. 5 is a block diagram illustrating an incoming call control system of a portable communication terminal.

In FIG. 5, reference numeral 201 denotes a portable communication terminal body; and 202, a vibrator.

The portable communication terminal body 201 comprises a reception unit 203, a transmission unit 204, a data processing unit 205, a CPU 206, a keyboard 207, an LCD 208, an amplifier 209, a speaker 210, a microphone 211, an amplifier 212, a transmission unit 213 for the vibrator, an antenna 214 and an antenna 215.

The reception unit 203 is used for receiving and demodulating a radio wave of 800 MHz for use in communicating with an ordinary predetermined base station. The transmission unit 204 is used for transmitting a radio wave of 900 MHz for use in communicating with the ordinary predetermined base station. The data processing unit 205 is a unit for performing data processing such as detecting synchronous bits and synchronous words from the received and demodulated data. The CPU 206 is used for controlling the whole portable telephone, a man-machine interface with a user, and a data transmitting-receiving protocol with the base station. The transmission unit 213 for the vibrator is a unit for sending out a radio wave for transmitting data to the vibrator 202 other than any radio wave used for normal communication with the base station.

The vibrator 202 comprises an antenna 216, a reception unit 217, a data demodulating unit 218, a CPU 219, a code storage unit 220 and a motor 221. The reception unit 217 is used for receiving a radio wave for the vibrator, which radio wave is transmitted from the portable telephone body 201. The data demodulating unit 218 is used for demodulating data from the radio wave for the vibrator. The CPU 219 is used for controlling the vibrator 202 such as comparing the received data with the code stored in the code storage unit 220 and controlling the motor 221. The code storage unit 220 is a unit for storing the code characteristic of the vibrator and the motor 221 is used for vibrating the casing of the vibrator 202.

A description will subsequently be given of the operation of the incoming call control system for the portable communication terminal shown in FIG. 5.

When the portable telephone body 201 detects an incoming call, the transmission unit 213 for the vibrator is caused to send out a radio wave other than what is used for normal communication and sends the radio wave via the antenna 214 to the side of the vibrator 202. The vibrator 202 receives the radio wave, makes the data demodulating unit 218 demodulate the radio wave, makes the CPU 219 compare the radio wave with the code stored in the code storage unit 220, decides that the radio wave is identified with what is transmitted from the corresponding portable telephone body 201 when both conform to each other, and starts rotating the motor 221 in order to notify the user about the incoming call.

As described above, the incoming call control system for the portable communication terminal shown in FIG. 5 is a system free from malfunction and highly reliable because the vibrator can be vibrated only when an incoming call is received by the portable telephone provided with the vibrator.

Figure 6:
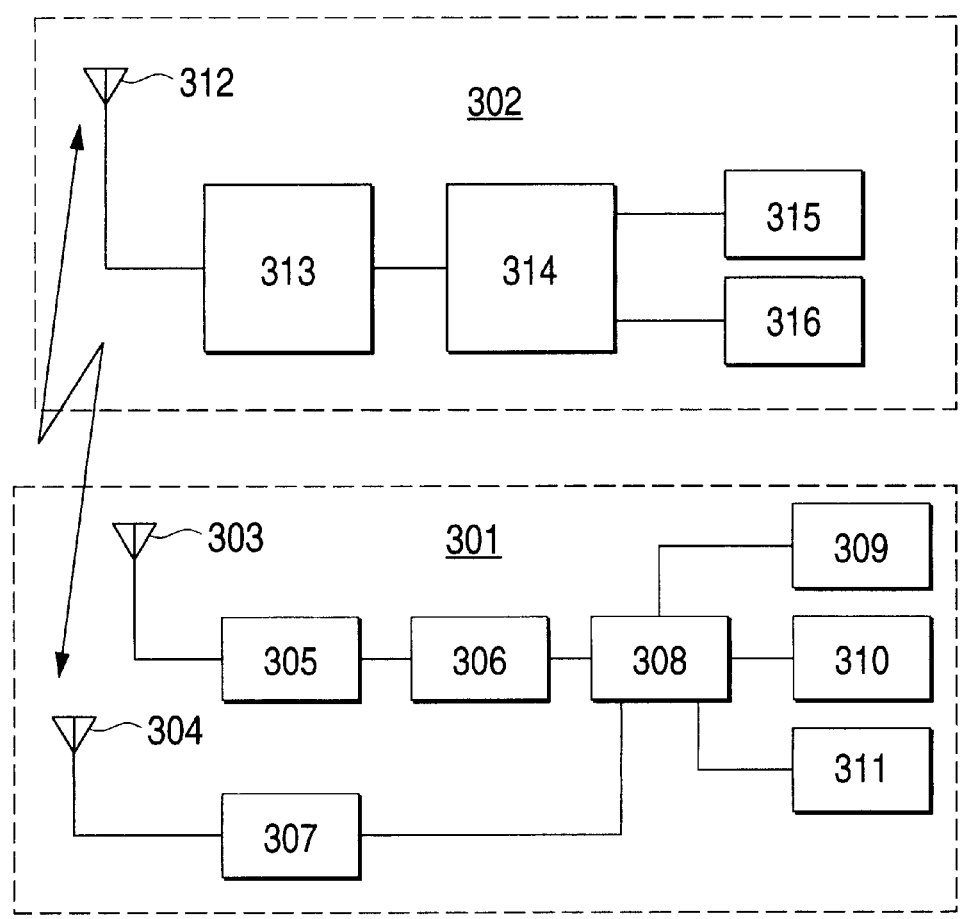
FIG. 6 is a block diagram illustrating an incoming call control system of a portable communication terminal.

FIG. 6 shows an incoming call control system for the portable communication terminal adapted for transmitting the ID signal as another embodiment of the present invention.

In FIG. 6, reference numeral denotes a portable telephone 301; and 302, a vibrator 302. The portable telephone 301 comprises an ordinary communication antenna 303, an antenna 304 for controlling the vibrator, an RF unit 305, a data processing unit 306, a 300 MHz transmission unit 307 for controlling the vibration of the vibrator 302, a control unit 308, a ten-key keyboard 309 capable of performing the operation of writing IDs, an EEPROM 310 and an LCD 311 as a display means for confirming the ID written.

The vibrator 302 comprises a receiving antenna 312 for receiving a radio wave of 300 MHz for controlling the vibrator, a reception unit 313, a CPU 314, an EEPROM 315 and a motor 316 rotated to vibrate the vibrator 302.

The operation of the portable terminal system shown in FIG. 6 will subsequently be described.

First, the user inputs an ID through the ten-key keyboard 309 in order to set and store the ID in the EEPROM 310 on the part of the portable telephone 301. The portable telephone 301 then makes the 300 MHz transmission unit 307 send the ID in the form of a weak radio wave of 300 MHz via the antenna 304 to the vibrator 302.

The vibrator 302 then receives the radio wave with the reception unit 313 via the antenna 312 and stored the ID contained in the 300 MHz signal in the EEPROM 315. Thus the setting of the ID in the portable telephone 301 through the operation of the ten-key keyboard 309 and in the vibrator 302.

As described above, the incoming call control system for the portable communication terminal shown in FIG. 6 is arranged so that the portable telephone can be made to correspond to the vibrator one-to-one by writing the set ID from the portable telephone body to the vibrator via radio. Therefore, the user is allowed to set any desired ID and write the ID to the vibrator and besides the writing operation is easily performed through the ten-key keyboard. Since an ID is writable from the portable telephone, the operation of initially writing such an ID to the incoming call device can be dispensed with and this not only simplifies production control at factories but also contributes to cost reduction as the number of production steps is reducible.

A description will subsequently be given of an incoming call control system for the portable communication terminal adapted for transmitting the ID signal as still another embodiment of the present invention by reference to FIGS. 7 and 8.

Figure 7:
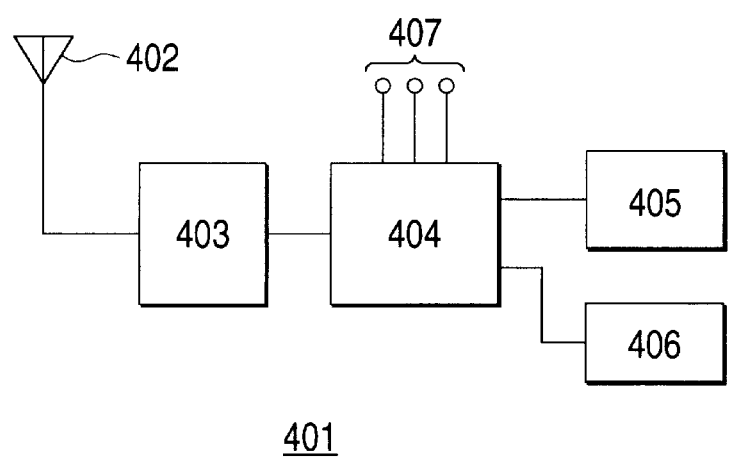
FIG. 7 is a block diagram illustrating an arrangement of a vibrator.

In reference to FIG. 7, a vibrator 401 receives a signal for notifying an incoming call over the radio from a portable telephone (not shown) via an antenna 402. The signal transmitted from the portable telephone contains an ID code indicative of the vibrator corresponding to the portable telephone. The signal received via the antenna 402 is sent via a reception unit 403 to a CPU 404 as a control means, which compares the ID code transmitted from the portable telephone and received by the reception unit 403 with the ID code written to and stored in an EEPROM 405; if both are found coincident with each other, the CPU 404 causes the vibrator 401 to vibrate by rotating a motor 406 so as to notify the user of an incoming call.

Reference numeral 407 refers to signal lines for connecting the CPU 404 to an external controller (not shown), so that the ID code is written to the EEPROM 405 of the vibrator 401.

With respect to the vibrator 401, an ID code is to be written to the storage unit of the vibrator 401 when it is shipped from the factory or when it is purchased.

Figure 8:
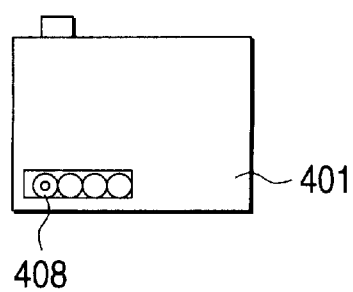
FIG. 8 is an external view of the vibrator shown in FIG. 7.

FIG. 8 is a diagram illustrating the external appearance of the vibrator 401. As shown in FIG. 8, the user can confirm by a seal 408 the ID code written to the EEPROM 405 by the external controller at the factory.

Then the ID is written by the user to the portable telephone through the ten-key keyboard on the portable telephone side by reference to the ID on the seal 408 stuck on the vibrator 401.

As described above, the incoming call control system for the portable communication terminal shown in FIGS. 7 and 8 is arranged so that the portable telephone can be made to correspond to the vibrator one-to-one-by setting the ID to the portable telephone body after the ID code indicated on the seal stuck on the vibrator is confirmed by the user as the ID code has been written by the external controller to the vibrator at the time the portable communication terminal is shipped from the factory. Therefore, the user is allowed to combine the vibrator with any portable telephone corresponding to the ID and besides easily set the ID. Even if the user purchases a vibrator afterward, he will be able to set the ID easily and need not make a setting (e.g., dip switch setting) on the vibrator side for the incoming call device of the portable telephone, that is, the user will be able to set the ID easily while looking at an LCD as the display unit of the portable telephone. As a result, the production control of vibrators at the factory is facilitated.

A description will subsequently be given of an incoming call control system for the portable communication terminal adapted for transmitting the ID signal as still another embodiment of the present invention by reference to FIG. 9.

Figure 9:
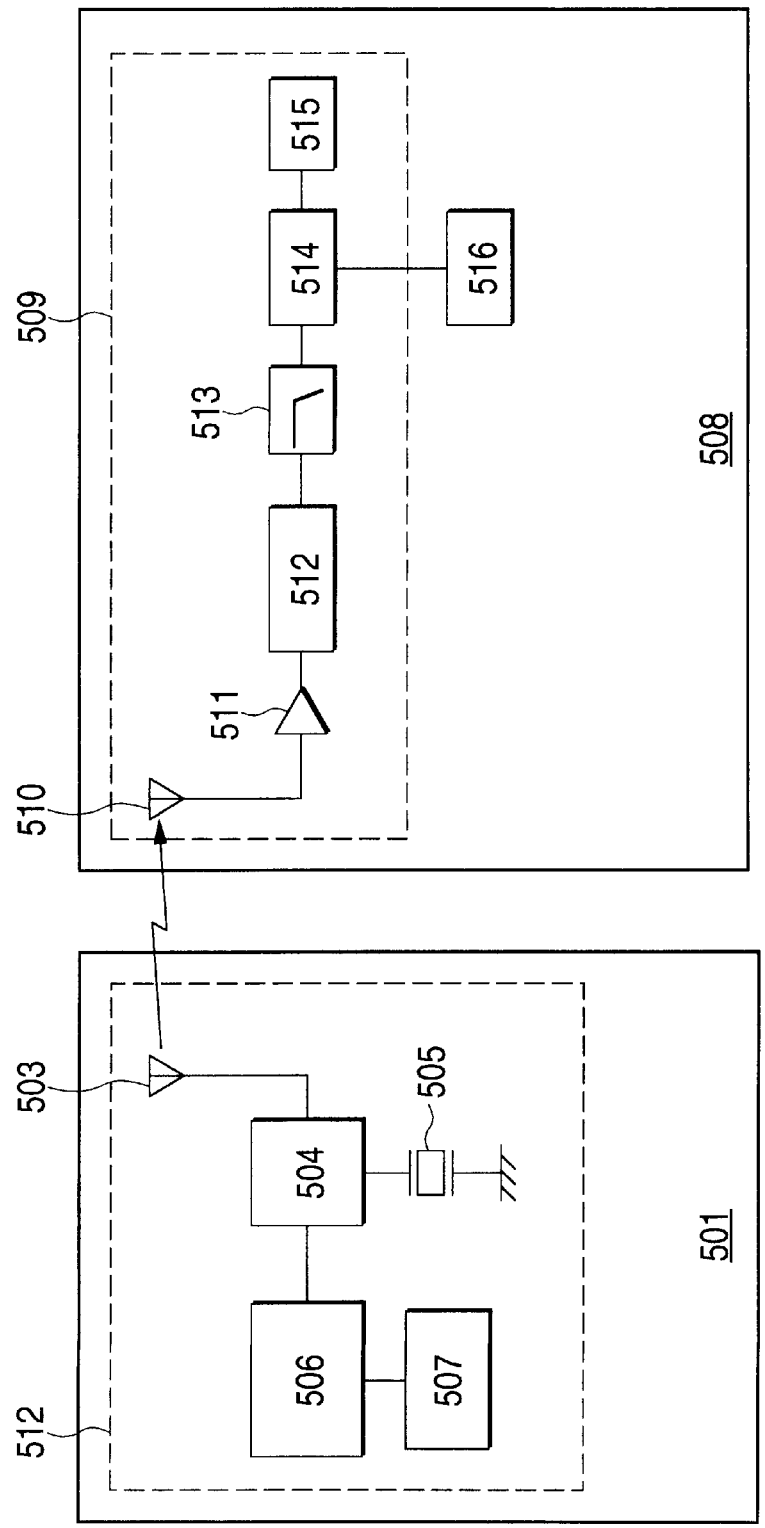
FIG. 9 is a circuit diagram illustrating a portable telephone and a vibrator.

In FIG. 9, reference numeral 501 denotes portable telephone body 501; and 502, a transmitting circuit 502 for notifying an external incoming call device 508 about an incoming call.

The transmitting circuit 502 includes an antenna 503 for transmitting a signal for notifying the incoming call device 508 about the incoming call, a modulator 504 for making pulse modulation by utilizing the crystal oscillation of a crystal oscillator 505 and the interruption of the crystal oscillator 505, so that data as a call identifying signal which is an ID of the incoming call device 508 is modulated before being transmitted thereby, a crystal oscillator 505, a CPU 506 and a memory 507.

The incoming call device 508 is provided with a receiving circuit 509 and a motor 516 which rotates to inform by vibration an incoming call on the basis of a signal from the receiving circuit 509.

The receiving circuit 509 includes an antenna 510 for receiving a radio wave from the antenna 503 of the transmitting circuit 502, a high-frequency amplifier circuit 511, a superregenerative detection circuit 512, a low-pass filter 513, a CPU 514 for interpreting the signal transmitted from the transmitting circuit 502 and controlling the motor 516 as a vibrating means and a memory 515 for prestoring an ID so that the CPU 514 as a control means compares the ID signal transmitted from the transmitting circuit 502 with the ID.

In the receiving circuit 509, a received signal is introduced via the high-frequency amplifier circuit 511 into the superregenerative detection circuit 512, where it is subjected to detection and demodulation in order to detect a call identifying signal and then subjected to waveform shaping through the low-pass filter 513 and ultimately precessed by the CPU 514.

Pulse modulation is used for data modulation. The transmitting circuit 502 actuates the crystal oscillator 505 to effect the pulse modulation. The receiving circuit 509 lets the superregenerative detection circuit 512 make superregenerative detection and lets the high-frequency amplifier circuit 511 make high-frequency amplification and detection.

As described above, the incoming call control system for the portable communication terminal shown in FIG. 9 is arranged so that the portable telephone can be made to correspond to the vibrator one-to-one, whereby the externally-fitted incoming call vibrator circuit is simplified. Therefore, this arrangement contributes to cost reduction as the number of parts is reducible.

Figure 10:
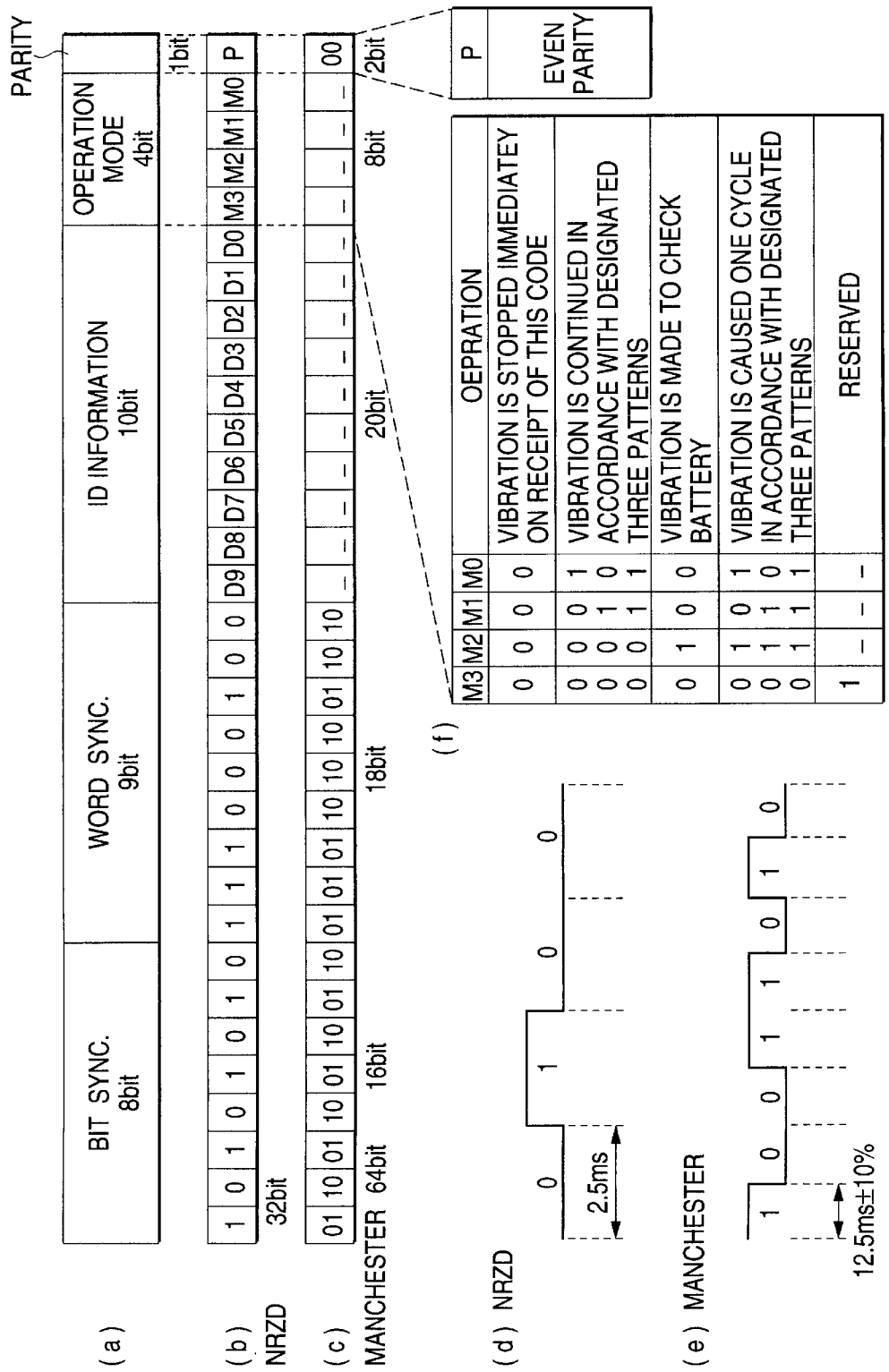
FIG. 10 is a diagram illustrating a data format of an ID signal transmitted from the portable telephone to the vibrator.

Referring to FIG. 10, there will be given a description of a data format of the ID signal transmitted from the portable telephone to the vibrator.

As shown in FIG. 1 previously, the portable telephone 110 has the antenna 112 for carrying out communication with the base station 115 via radio, the mainframe circuit 114 for demodulating the signal transmitted from the base station 115 via the antenna 112 connected thereto, and the control unit 116 for causing the portable telephone 110 to perform its communication functions by controlling the respective parts of the portable telephone 110, the control unit 116 being connected to the mainframe circuit 114.

The portable telephone 110 has a remote control function for driving the vibrator 125 as its incoming call notifying device via radio. More specifically, the vibrator communication circuit 118 is connected to the control unit 116 and so controlled by the control unit 116 as to transmit the ID signal subjected to high-frequency amplification from the remote control antenna 120 over the weak radio wave to the vibrator 125.

Upon receipt of the ID radio wave from the remote control antenna 120 of the portable telephone 110 via the remote control antenna 127, the vibrator 125 subjects the transmitted signal to high-frequency amplification using the high-frequency amplifier circuit 129 and interprets the ID signal detected by the high-sensitive data detection circuit 131, which starts the rotation of the motor 133 as a drive source for performing the operation of vibrating the vibrator 125.

With the portable telephone 110 and the vibrator 125 thus arranged, the portable telephone 110 notifies the vibrator 125 about an incoming call from the base station 115 by transmitting the ID signal over the weak radio wave to the vibrator 125 when the portable telephone 110 decides that it has received the call from the base station 115 over the radio.

With this decision, the vibrator 125 causes itself to totally vibrate by rotating the motor 133 so as to notify the user about the incoming call directed to the portable telephone 110. It is therefore ensured that the user is notified of the incoming call even when the portable telephone 110 is put in a bag or placed somewhere separately from the body.

In the case of such a portable telephone 110 as an example, the time division multiplex access (TDMA) system for exchanging signals by putting an amount of data (frame) on a time slot is employed for radio communication with the base station 115 and with the vibrator 125.

FIG. 10 is a diagram showing a format of data frames to be put on the time slot when a signal is transmitted from the portable telephone 110 to the vibrator 125. More specifically, the data format shown in FIG. 10(a) includes a bit synchronizing frame (8 bits), a word synchronizing frame (9 bits), a frame of ID information (10 bits), a frame in an operating mode (4 bits) and a parity frame (1 bit).

The bit synchronizing frame is loaded with data for use in clock regeneration on the side of the vibrator 125. The word synchronizing frame is loaded with data for use in frame synchronization for obtaining the ID information on the side of the vibrator 125.

The frame of the ID information is loaded with data on ID information characteristic of the portable telephone 110. The frame in the operating mode is loaded with data indicating various operating modes designated by the portable telephone 110. Further, the parity frame is loaded with data for use in detecting the presence or absence of a code error.

As shown in FIG. 10(f), there are different kinds of operating modes wherein, for example, "vibration is stopped immediately on receipt of the code," "vibration is continued in accordance with designated three patterns," "vibration is made to check the balance of the battery of the vibrator," and "reservation," these corresponding to the respective codes.

FIG. 10(b) shows an example of an NRZD signal in the full-rate mode prepared on the side of the portable telephone 110 and FIG. 10(c) shows an example of a Manchester coded signal in the half-rate mode wherein the signal is coded before it is transmitted from the portable telephone 110 to the vibrator 125.

FIG. 10(d) shows a waveform chart of the NRZD signal and FIG. 10(e) shows a waveform chart of the Manchester coded signal. In the vibrator 125, the Manchester coded signal shown in FIGS. 10(c) and (d) is received and demodulated into the NRZD signal for use. Therefore, the Manchester coded signal is usable for the transmission of the ID signal over the weak radio wave.

An ASK digital signal modulation system is used as a modulation system to be implemented before the vibrator communication circuit 118 of the portable telephone 110 transmits a signal. The transmission rate of the signal transmitted from the remote control antenna 120 is 400 bps with 1 bit being 2.5 ms in the full-rate mode and 1.25 ms in the half-rate mode. One data length with the loaded data format of FIG. 10(a) is 32 bits×2.5 ms (full-rate)=80 ms.

The operating modes in the above embodiment of the invention are not limited to those shown in FIG. 10(f) by way of example.

In the above embodiment of the invention, moreover, any digital modulation system other than the ASK digital modulation system may be employed as a proper modulation system.

Although the data length has been set to 80 ms with a transmission rate of 400 bps in the above embodiment of the invention, other values may be employed for the transmission rate and the data length.

Although a description has been given of the portable (cellular) telephone by way of example in the above embodiment of the invention, other portable communication terminals such as a PHS may be used for the purpose according to the present invention.

Although a description has been given of a case where the vibrator 125 is used to inform an incoming call by vibration as the incoming call notifying device, an incoming call notifying device for notifying an incoming call by means of voice such as an alarm may also be used likewise. As described above, the ID signal, that is, the data format of the ID signal shown in FIG. 10 is transmitted from the portable communication terminal to the incoming call notifying device via radio when an incoming call is received by the portable communication terminal and the incoming call notifying operation is performed after the incoming call notifying device detects the ID signal. Therefore, a radio wave from any other portable communication terminal is prevented from being detected to ensure that the incoming call notifying operation is performed by detecting only the incoming call directed to the user's own portable communication terminal and that the malfunction of the incoming call notifying device is thus prevented.

The clock regeneration on the incoming call notifying device side can be effected by the bit synchronizing frame provided for the data format of the ID signal and the frame synchronization for acquiring the ID information can be effected by the word synchronizing frame, and the ID information on the portable communication terminal side is made readable by the ID information frame, whereby it is ensured that the malfunction of the incoming call notifying device is prevented by using the ID signal.

Figure 11:
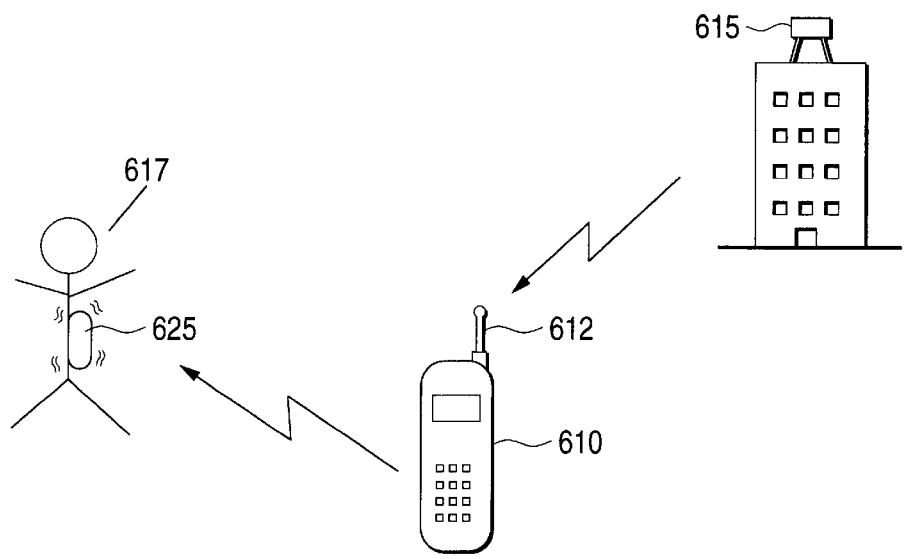
FIG. 11 is a conceptual diagram illustrating the operation of the portable telephone and the vibrator.

A description will subsequently be given of the radio wave of the ID signal transmitted from the portable telephone to the vibrator by reference to FIGS. 11 and 12.

As shown in FIG. 1 previously, the portable telephone 110 has the antenna 112 for carrying out communication with the base station 115 via radio, the mainframe circuit 114 for demodulating the signal transmitted from the base station 115 via the antenna 112 connected thereto, and the control unit 116 for causing the portable telephone 110 to perform its communication functions by controlling the respective parts of the portable telephone 110, the control unit 116 being connected to the mainframe circuit 114.

The portable telephone 110 has the remote control function for driving the vibrator 125 as its incoming call notifying device via radio. More specifically, the vibrator communication circuit 118 is connected to the control unit 116 and so controlled by the control unit 116 as to transmit the ID signal subjected to high-frequency amplification from the remote control antenna 120 over the weak radio wave to the vibrator 125.

Upon receipt of the weak radio wave from the remote control antenna 120 of the portable telephone 110 via the remote control antenna 127, the vibrator 125 subjects the transmitted signal to high-frequency amplification using the high-frequency amplifier circuit 129 and interprets the ID signal detected by the high-sensitive data detection circuit 131, which starts the rotation of the motor 133 as a drive source for performing the operation of vibrating the vibrator 125.

The weak radio wave from the remote control antenna 120 of the portable telephone 110 is in the frequency range of 250 MHz –322 MHz.

With the portable telephone 110 and the vibrator 125 thus arranged, a portable telephone 610 notifies a vibrator 625 about an incoming call from a base station 615 by transmitting the ID signal over the weak radio wave to the vibrator 625 when the portable telephone 610 decides that it has received the call from the base station 615 over the radio. With this decision, the vibrator 625 causes itself to totally vibrate by rotating the motor 133 so as to notify the user about the incoming call directed to the portable telephone 610. It is therefore ensured that the user 617 is notified of the incoming call even when the portable telephone 610 is put in a bag or placed somewhere separately from the body.

Although a weak radio wave has to be used for the incoming call notifying device of the portable communication terminal as stated above, the greater the area where an incoming call to the portable telephone 610 can be notified, the greater the convenience to the user 617 who is carrying the portable motor-driven vibrator 625 with him/her.

Under the Radio Law or Regulation, 500 $\mu$V/m is an upper limit value with the peak value in a place three meters apart in reference to a radio wave of not greater than 322 MHz, whereas 35 $\mu$V/m is an upper limit value with the peak value in three meters apart in reference to a radio wave of not lower than 322 MHz; thus electric power to be consumed greatly varies with 322 MHz as a boundary. It is preferred to use a radio wave of not greater than 322 MHz in view of not only improving convenience to the user but also reducing power consumption.

Figure 12:
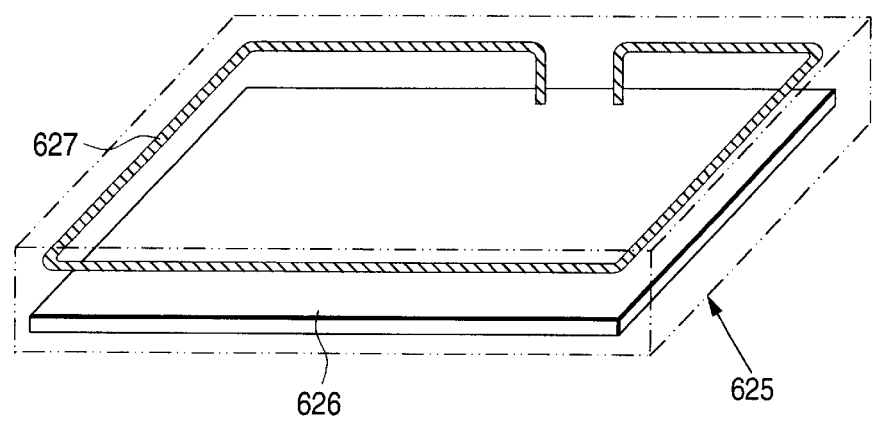
FIG. 12 is a schematic perspective view of a vibrator.

FIG. 12 is a schematic diagram of a portable vibrator 625 with a motor. The vibrator 625 is provided with a substrate 626, a loop antenna 627, a front case (illustration of the rest omitted), a rear case, a battery, a motor and the like. In consideration of greater portability, the vibrator 625 needs to have an area of about 2,500 mm$^2$ or less and a thickness of about 15 mm or less.

On the other hand, one of the dominant factors is an antenna gain when the sensitivity performance of the vibrator 625 is taken into consideration. In the case of a vibrator 625 to be carried with the human body, a magnetic-field type loop antenna is employed because its characteristic deterioration due to the human body is low. However, a high gain is not secured satisfactorily unless the loop length is set to 0.15–0.2 in wavelength.

Consequently, the loop length necessary for securing such a greater gain, that is, the opening area of the loop antenna is inversely proportional to the frequency. This means the opening area of the loop antenna is desired to be preferably smaller in order to materialize a small-sized, easy-to-carry vibrator 625 and this makes it advantageous to choose high frequency. In view of this problem, it is advantageous to avoid a frequency of 250 MHz or lower.

Thus the use of the frequency range of 250 MHz–322 MHz is judged appropriate to meet a demand for increasing an area of use by means of the weak radio wave on one hand and a demand for improving portability by making compact the portable vibrator 625 with the motor on the other.

Therefore, the weak radio waves ranging from 250 MHz to 322 MHz are used for the ID signal transmitting signal from the portable telephone 610 to the vibrator 625.

Although a description has been given of the portable (cellular) telephone by way of example in the above embodiment of the invention, other portable communication terminals such as a PHS may be used for the purpose according to the present invention.

Although a description has been given of a case where the vibrator 625 is used to inform an incoming call by vibration as the incoming call notifying device, an incoming call notifying device for notifying an incoming call by means of voice such as an alarm may also be used likewise.

In the incoming call control system of the portable communication terminal described above, the ID signal is transmitted from the portable communication terminal to the incoming call notifying device via radio when an incoming call is received by the portable communication terminal and the incoming call notifying operation is performed after the incoming call notifying device detects the ID signal. Therefore, a radio wave from any other portable communication terminal is prevented from being detected to ensure that the incoming call notifying operation is performed by detecting only the incoming call directed to the user's own portable communication terminal and that the malfunction of the incoming call notifying device is thus prevented.

The use of weak radio waves ranging from 250 MHz to 322 MHz for transmitting the ID signal from the portable communication terminal to the incoming call notifying device via radio results in increasing an area of notification of an incoming call to the user, thus improving convenience to the user and making it favorable to make the incoming call notifying device compact.

In the aforementioned system wherein the vibrator is vibrated only when a special signal for controlling the vibrator from the portable communication terminal conforms to the signal stored in the memory of the vibrator in order to prevent the malfunction of the vibrator, that is, only when that special signal conforms to the ID signal transmitted so that the vibrator can identify the portable communication terminal, the vibrator needs a high-sensitive ID data detection circuit for monitoring a weak radio wave in order to detect the ID signal when the portable communication terminal uses the weak radio wave as what is specifically used for controlling the vibrator; however, the regular operation of the such a high-sensitive ID data detection circuit poses a problem in that the life of a battery is shortened because of an increase in power consumption.

In order to solve that problem, an increase in the power consumption resulting from the regular operation of the high-sensitive ID data detection circuit is considered to be made reducible by adopting an intermittent reception system wherein the operation of the high-sensitive ID data detection circuit is switched over to an operating mode from a sleep mode in a predetermined cycle.

In a case where the data reception is started after the operating mode is established, a reduction in the power consumption is limited provided a series of data including bit synchronizing data, word synchronizing data, ID information and the like is detected one by one with respect to a non-data signal and the problem is that a further reduction therein is impossible.

A description will subsequently be given of a portable terminal system so designed as to reduce the power consumption by shortening the useless detecting operation performed by a received data detection circuit by reference to FIGS. 13–16.

As shown in FIG. 1 previously, the portable telephone 110 has the antenna 112 for carrying out communication with the base station 115 via radio, the mainframe circuit 114 for demodulating the signal transmitted from the base station 115 via the antenna 112 connected thereto, and the control unit 116 for causing the portable telephone 110 to perform its communication functions by controlling the respective parts of the portable telephone 110, the control unit 116 being connected to the mainframe circuit 114.

The portable telephone 110 has the remote control function for driving the vibrator 125 as its incoming call notifying device via radio. More specifically, the vibrator communication circuit 118 is connected to the control unit 116 and so controlled by the control unit 116 as to transmit the signal subjected to high-frequency amplification from the remote control antenna 120 over the weak radio wave to the vibrator 125. The signal thus transmitted is an ID signal, that is, formed of a signal characteristic of the portable telephone 110 and indicative of the identity of the portable telephone 110.

Figure 13:
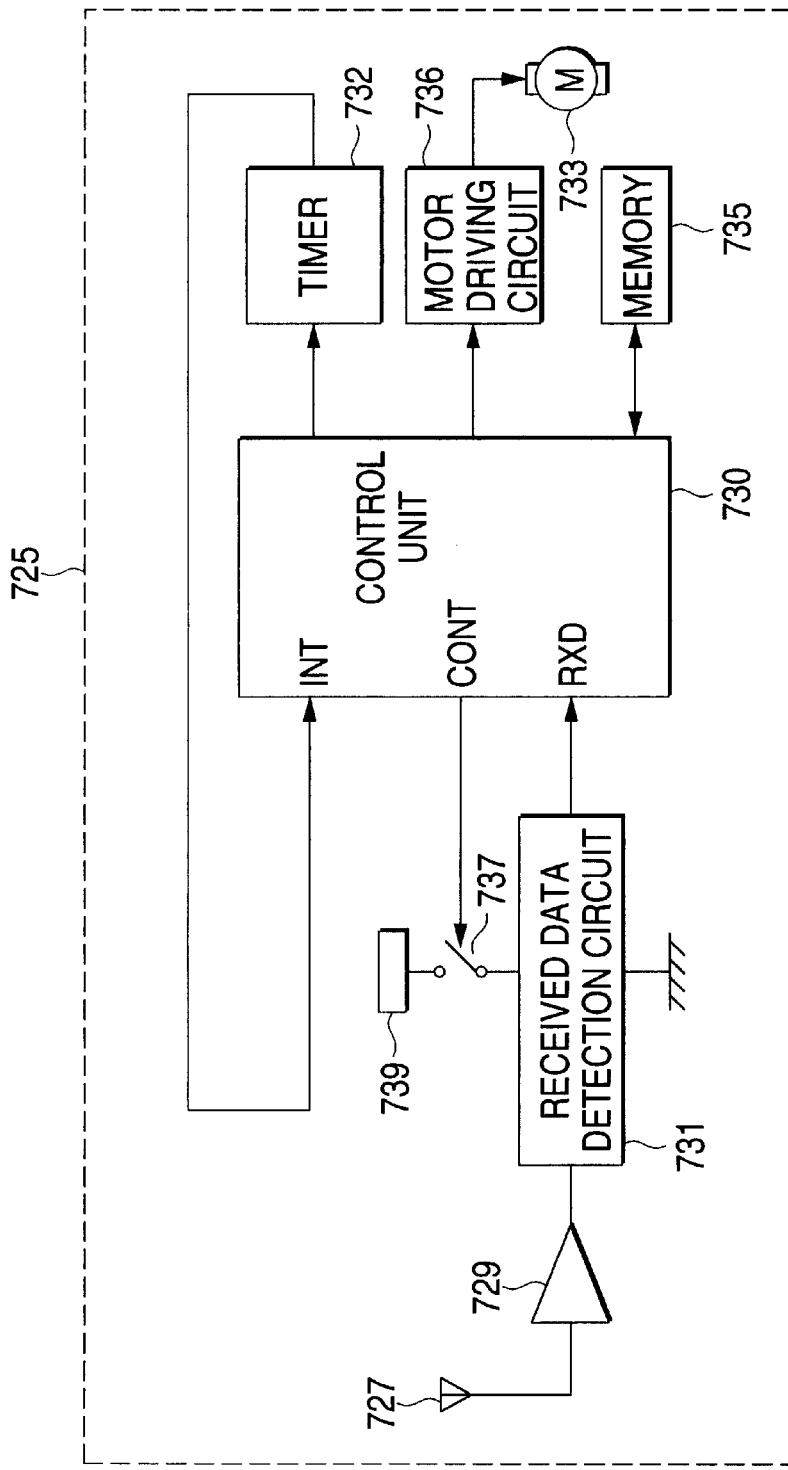
FIG. 13 is a block diagram illustrating the construction of a vibrator.

Upon receipt of the radio wave from the remote control antenna 120 of the portable telephone 110 via a remote control antenna 727, a vibrator 725 of FIG. 13 subjects the transmitted signal to high-frequency amplification using a high-frequency amplifier circuit 729, detects the ID signal detected by a received data detection circuit (received data detection unit) 731 and inputs its data to a control unit 730. A power supply 739 is actuated when a switch 737 is caused to conduct under the control of the control unit 730, and the received data detection circuit 731 is switched over to the operating mode wherein it is capable of high-sensitive operation.

The control unit 730 decides whether the data detected by the received data detection circuit 731 is like data, then decides whether the like data is bit synchronizing data, subsequently identifies word synchronizing data after identifying the bit synchronizing data, then identifies ID information after identifying the word synchronizing data, and finally decides whether the ID data stored in a memory 735 is identified with the ID information after identifying the ID information. Then a motor 733 as a drive source of the vibrating operation of the vibrator 725 is started to rotate via the operation of a motor driving circuit 736 when the ID data is identified.

Thus the control unit 730 is adapted to identify the data detected by the received data detection circuit 731 stepwise.

The vibrator 725 has a timer 732 which is started by a timer starting signal from the control unit 730 and outputs a switch starting signal (transfer signal) after counting time equivalent to the predetermined cycle. The switch starting signal that is output from the timer 732 is input to the control unit 730. When the switch starting signal is fed from the timer 732, the control unit 730 exerts control so that the switch 737 is caused to conduct.

With a portable telephone 710 and the vibrator 725 thus arranged, the portable telephone 110 notifies a vibrator 725 about an incoming call from the base station 115 by transmitting the ID signal over the weak radio wave to the vibrator 725 when the portable telephone 110 decides that it has received the call from the base station 115 over the radio. Then the vibrator 725 decides whether the ID signal is identified with the signal stored in the memory 735 and with this decision, the vibrator 725 causes itself to totally vibrate by rotating the motor 733 so as to notify the user about the incoming call directed to the portable telephone 110. It is therefore ensured that the user is notified of the incoming call even when the portable telephone 110 is put in a bag or placed somewhere separately from the body as long as the vibrator 725 is kept in contact with the body.

With respect to the basic operation thus performed, the received data detection circuit 731 needs switching from the sleep mode as a low power consumption state to the operating mode wherein a high-sensitive detecting operation is possible on the basis of the switch starting signal from the timer 732 in the predetermined cycle so as to vibrate the vibrator 725.

Figure 14:
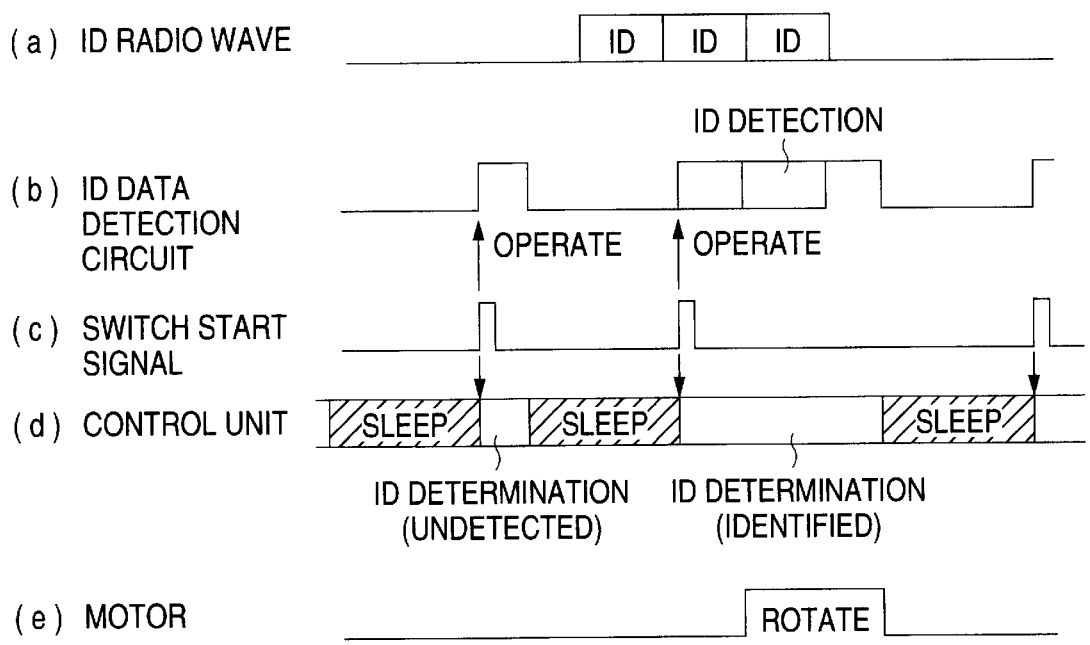
FIG. 14 is a time chart showing the operation of the vibrator shown in FIG. 13 with the passage of time.

A description will subsequently be given of the operation of the vibrator 725 by reference to FIG. 14. The ID radio wave is transmitted from the remote control antenna 120 of the portable telephone 110 when an incoming call is received by the portable telephone 110 (FIG. 14(a)) and the switch starting signal is output from the timer 732 in the predetermined cycle (FIG. 14(c)) before being input to the control unit 730. When the switch starting signal from the timer 732 is input to the control unit 730, the switch 737 is caused to conduct under the control of the control unit 730 and the power supply 739 causes the received data detection circuit 731 in the sleep mode to be switched over to the operating mode.

Therefore, the received data detection circuit 731 is allowed to detect the signal received by the remote control antenna 727 via the high-frequency amplifier circuit 729 (FIG. 14(b)). If no ID signal is received from the portable telephone 110 (in a state wherein no incoming call is received by the portable telephone 110), the original sleep mode is restored.

With the passage of time for a predetermined period, the received data detection circuit 731 is switched over to the operating mode again on the basis of the switch starting signal from the timer 732 and detects the ID signal, if any, transmitted from the portable telephone 110 (FIG. 14(b)). Then the received data detection circuit 731 rotates the motor 733 when the control unit 730 identifies the ID data with the data stored in the memory 735.

Therefore, the received data detection circuit 731 is arranged so that it operates intermittently on the basis of the switch starting signal from the timer 732 and the power consumption is made reducible since the received data detection circuit 731 need not be always kept in the operating mode wherein it operates with high sensitivity.

Although a description has been given of a case where the data received by the remote control antenna 727 is adequate ID data from the remote control antenna 120 of the portable telephone 110, a description will further be given of a case, for example, where the remote control antenna 727 may pick up a radio wave, noise or the like other than the signal from the portable telephone 110.

Figure 15:
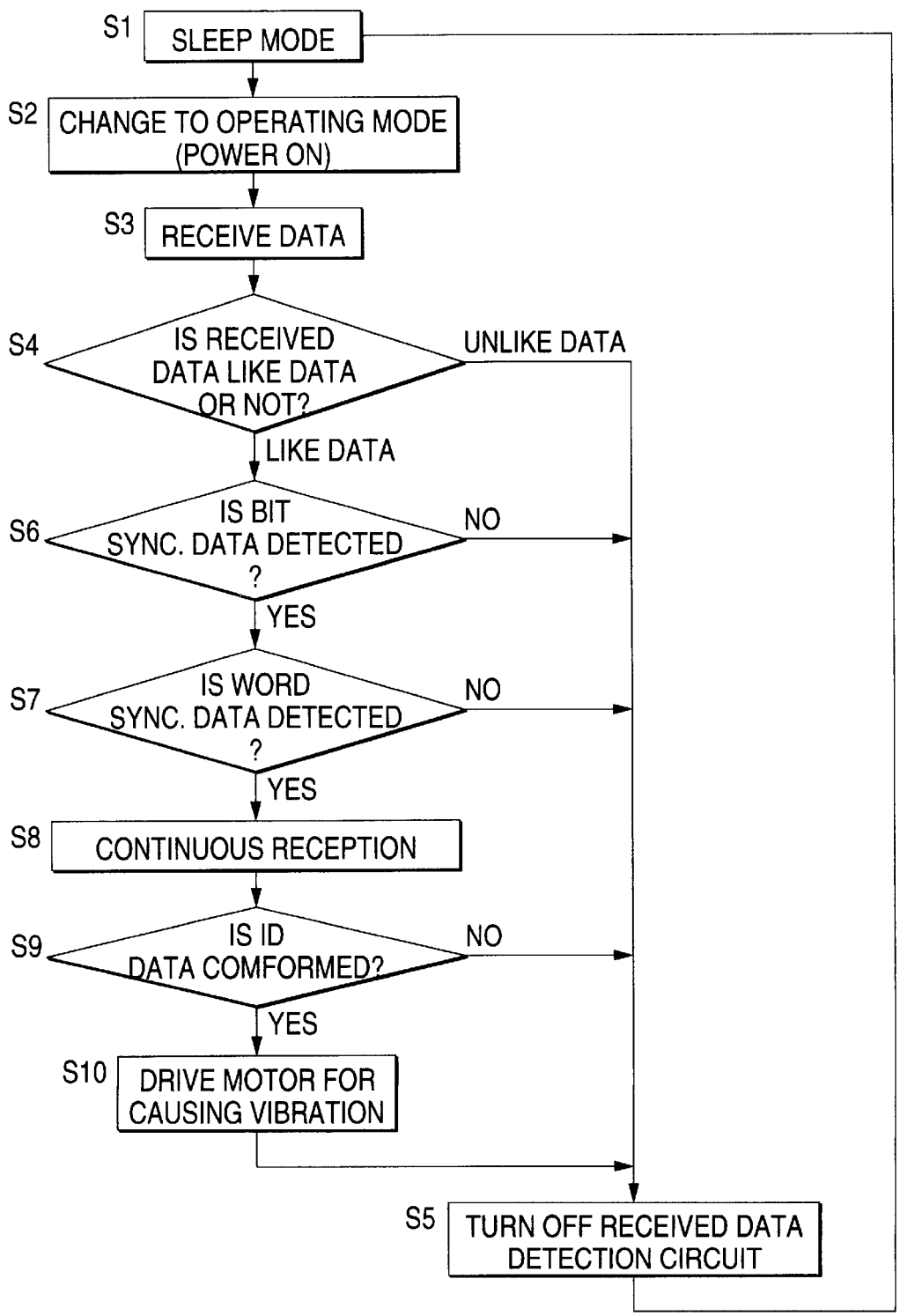
FIG. 15 is a flowchart showing operating procedure of the vibrator shown in FIG. 13.

A description will be given of the operating procedure of the vibrator 725 in reference to a flowchart of FIG. 15 and a data format of FIG. 16 to be transmitted by the portable telephone 110 to the vibrator 725.

When no switch starting signal is output from the timer 732, the received data detection circuit 731 is kept in the sleep mode (Step S1 of FIG. 15) and when the switch starting signal is output from the timer 732 in the predetermined cycle, the received data detection circuit 731 is switched over to the operating mode (Step S2). When any data is received by the remote control antenna 727 then (Step S3), the received data detection circuit 731 detects the data and causes the result of detection to be input to the control unit 730 each time it is received thereby.

The control unit 730 decides whether the data detected by the received data detection circuit 731 is like proper data (Step S4) and decides that it is unlike data when it is noise like what does not constitute the data format. In order to stop any useless detecting operation thereafter, the control unit 730 causes the power supply 739 to be turned off so as to put the received data detection circuit 731 in the sleep mode (Step S5).

Figure 16:
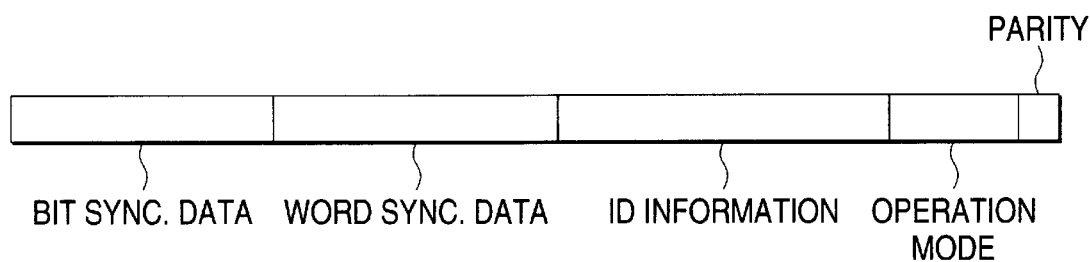
FIG. 16 is a diagram illustrating a data format of a signal transmitted from the portable telephone to the vibrator.

When the data detected by the received data detection circuit 731 is decided to be like data at Step S4, bit synchronizing data in the leading portion of the data format shown in FIG. 16 is detected (Step S6) and unless the bit synchronizing data is detected, the power supply of the received data detection circuit 731 is instantly turned off (Step S5). If the bit synchronizing data is detected, word synchronizing data of the data format of FIG. 16 is detected (Step S7) and unless the word synchronizing data is detected, the power supply of the received data detection circuit 731 is instantly turned off (Step S5).

When the word synchronizing data is detected, the vibrator 725 continues receiving the data format of FIG. 16 without turning off the power supply of the received data detection circuit 731 (Step S8) and the received data detection circuit 731 continues inputting the detected result of the data format to the control unit 730, whereby the control unit 730 accepts the reception of ID information, decides whether the data conforms to the ID data prestored in the memory 735 by comparison (Step S9) and unless both do not conform to each other, the power supply of the received data detection circuit 731 is instantly turned off (Step S5).

When the data conforms to the ID data, the control unit 730 identifies the operating mode data received from the received data detection circuit 731 and by rotating the motor 733 according to the vibrating method designated by the operating mode data (Step S10), causes the whole vibrator 725 to vibrate. The vibrator 725 turns off the power supply of the received data detection circuit 731 after informing the user about the incoming call (Step S5) and the received data detection circuit 731 returns to the sleep mode (Step S1).

With the vibrator 725 of the portable telephone 110 thus constructed, the control unit 730 identifies the data detected by the received data detection circuit 731 stepwise and when the detecting operation of the received data detection circuit 731 is found unnecessary any longer, switches the received data detection circuit 731 from the operating mode to the sleep mode as quickly as possible depending on the stage the received data detection circuit 731 is situated. In a case where the signal detected by the received data detection circuit 731 is not a proper one, the power consumption can be made reducible further by returning the received data detection circuit 731 to the sleep mode from the operating mode immediately after the nonconformity is proved so as to shorten the useless detecting operation performed by the received data detection circuit 731; thus the power consumption is made reducible further.

Although a description has been given of the portable (cellular) telephone by way of example in the above embodiment of the invention, other portable communication terminals such as a PHS may be used for the purpose according to the present invention.

Although a description has been given of a case where the vibrator 725 is used to inform an incoming call by vibration as the incoming call notifying device, an incoming call notifying device for notifying an incoming call by means of voice such as an alarm may also be used likewise.

As described above, the incoming call control system of the portable communication terminal shown in FIGS. 13–16 is so designed that by causing the timer 732 to output an signal in the predetermined cycle, the control unit intermittently switches the received data detection circuit from the sleep mode to the operating mode to have the ID radio wave from the portable communication terminal detected when an incoming call is received by the portable communication terminal then, whereby the received data detection circuit is returned to the sleep mode in any other time zone other than the time zone wherein it is switched over to the operating mode in the predetermined cycle. Thus the power consumption is made reducible since the received data detection circuit need not be always kept in the operating mode wherein it operates with high sensitivity.

Further, the control unit identifies the data detected by the received data detection circuit stepwise and when the detecting operation of the received data detection circuit is found unnecessary any longer, switches the received data detection circuit from the operating mode to the sleep mode as quickly as possible depending on the stage the received data detection circuit is situated. In the case where the signal detected by the received data detection circuit is not a proper one, the power consumption can be made reducible further by returning the received data detection circuit to the sleep mode from the operating mode immediately after the nonconformity is proved so as to shorten the useless detecting operation performed by the received data detection circuit; thus the power consumption is made reducible further.

A description will subsequently be given of a loop antenna which is loaded on the incoming call notifying device of the portable communication terminal by reference to FIGS. 17–19.

As shown in FIG. 1 previously, the portable telephone 110 has the antenna 112 for carrying out communication with the base station 115 via radio, the mainframe circuit 114 for demodulating the signal transmitted from the base station 115 via the antenna 112 connected thereto, and the control unit 116 for causing the portable telephone 110 to perform its communication functions by controlling the respective parts of the portable telephone 110, the control unit 116 being connected to the mainframe circuit 114.

The portable telephone 110 has the remote control function for driving the vibrator 125 as its incoming call notifying device via radio. More specifically, the vibrator communication circuit 118 is connected to the control unit 116 and so controlled by the control unit 116 as to transmit the ID signal subjected to high-frequency amplification from the remote control antenna 120 over the weak radio wave to the vibrator 125.

Upon receipt of the ID radio wave from the remote control antenna 120 of the portable telephone 110 via the remote control antenna 127, the vibrator 125 subjects the transmitted signal to high-frequency amplification using the high-frequency amplifier circuit 129 and interprets the ID signal detected by the high-sensitive data detection circuit 131, which starts the rotation of the motor 133 as a drive source for performing the operation of vibrating the vibrator 125.

Figure 17:
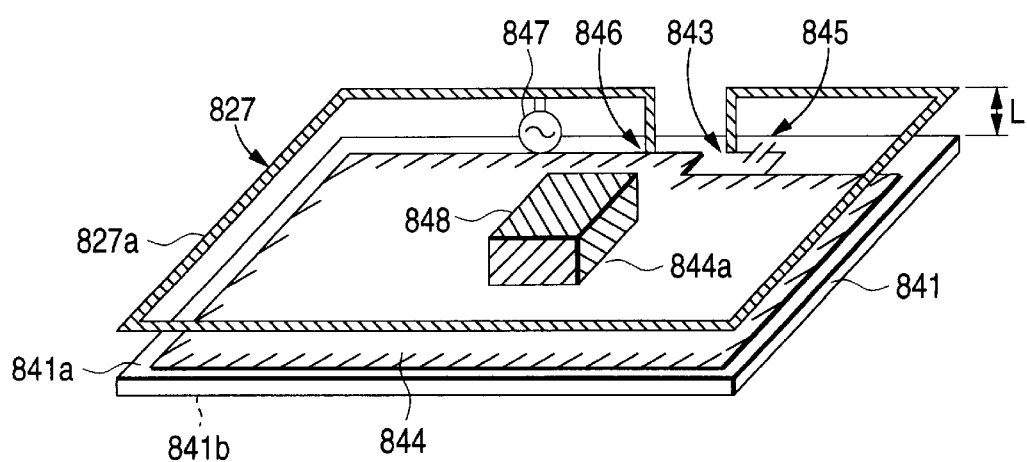
FIG. 17 is a detailed perspective view of a loop antenna.

A loop antenna 827 in such a form as shown in FIG. 17 is used as the remote control antenna 127 of the vibrator 125. As shown in FIG. 17, the surface of a grounded board 841 and the open face of the loop antenna 827 are set parallel to each other and the external shape of the loop antenna 827 is substantially equal in shape and size to that of the grounded board 841 (i.e., the external shape of the grounded portion 844 thereof)

While the vibrator 125 is fitted to the human body (e.g., put into a pocket), the opening face of the loop antenna 827 is set parallel to the tangential surface of the human body. Moreover, a tuning capacitive capacitor 845 is juxtaposed between one end portion 843 of the loop antenna 827 and a grounded portion 844. The other end portion 846 of the loop antenna 827 and the grounded portion 844 are short-circuited and the loop antenna 827 is supplied with power from a tap feeding part 847.

With a portable telephone 110 and the vibrator 125 thus arranged, the portable telephone 110 notifies the vibrator 125 about an incoming call from the base station 115 by transmitting the ID signal over the weak radio wave to the vibrator 125 when the portable telephone 110 decides that it has received the call from the base station 115 over the radio.

Then the vibrator 125 identifies the ID signal and causes itself to totally vibrate by rotating the motor 133 so as to notify the user about the incoming call directed to the portable telephone 110. It is therefore ensured that the user is notified of the incoming call even when the portable telephone 110 is put in a bag or placed somewhere separately from the body.

With the loop antenna 827 thus arranged, the opening area of the loop antenna 827 can be made greater than before and its gain is improvable further. In consideration of packaging parts in contact with both the surface and undersurface of the grounded board 841, the provision of a thick part 848 on the grounded portion 844 of a board surface 841a and in the central portion 844a of the loop antenna 827 prevents its gain from deteriorating because of the part situated close to the loop antenna 827 and also prevents its properties from fluctuating at the time of mass production.

With a thin part which is disposed on the under surface 841b of the grounded board 841, further, a greater distance L can be provided between the grounded board 841 and the wire 827a of the loop antenna 827, so that the gain is made improvable further. From experiments carried out for the purpose, a higher gain is seen to be obtainable on condition that a distance of not less than 1/40 of the wavelength, namely, a distance L of not less than 2.5 mm is secured in a case where a radio frequency to be transmitted is 300 MHz, for example.

At 300 MHz, the sensitivity with respect to both horizontal and vertical polarized waves corresponds to the following gain characteristic values (1), (2) and (3) given the following measurements: the grounded board 841 of the vibrator 125 is 20 mm (width)×50 (length); and the loop is 20 mm (width)×50 mm (length)×4.5 mm (height).

|  | Horizontal polarized wave | Vertical polarized wave |  |
| --- | --- | --- | --- |
| Direction A (turned upward) | −15. 3dBd | −15. 0dBd | . . . (1) |
| Direction B (stand-longitudinal) | −14. 8dBd | −12. 7dBd | . . . (2) |
| Direction C (stand-lateral) | −16. 7dBd | −15. 3dBd | . . . (3) |

Figure 18:
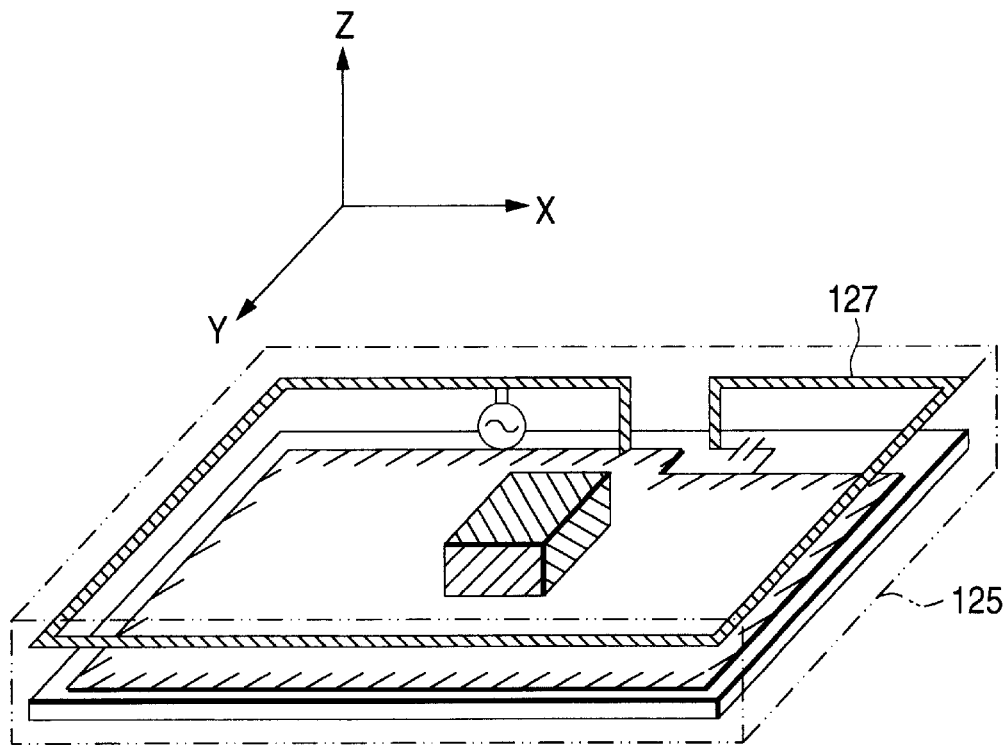
FIG. 18 is a diagram illustrating measuring directions of sensitivity with respect to both horizontal-vertical polarized waves of the loop antenna.

When the measurement is made in the direction of A in FIG. 18, the loop antenna 827 is to be turned on the XY plane and when the measurement is made in the direction of B, the loop antenna 827 is to be turned on the YZ plane and when the measurement is made in the direction of C, the loop antenna 827 is to be turned on the ZX plane.

Figure 19:
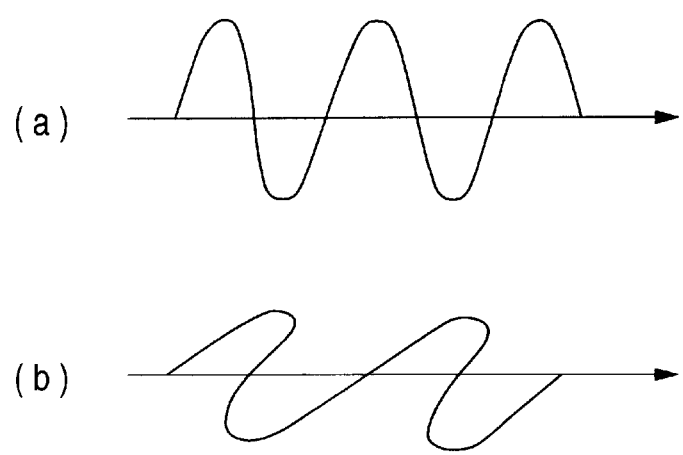
FIG. 19 is a diagram illustrating both horizontal-vertical polarized waves concerning the sensitivity measurement of the loop antenna shown in FIG. 17;.

FIG. 19 shows both the horizontal and vertical polarized wave planes, where FIG. 19(a) indicates the vertical polarized wave and FIG. 19(b) the horizontal polarized wave.

Further, the gain characteristic values indicate the respective peak values in terms of the dipole ratio.

Further, impedance matching between the loop antenna 827 and a power supply line is obtained by supplying power with the tap feeding part 847. A tuning capacitive capacitor 845 of 0.5 pF is employed and operated at about 300 MHz.

Since the loop antenna 827 is a magnetic-field type antenna, it is hardly affected by the human body as before.

Although a description has been given of the portable (cellular) telephone by way of example in the above embodiment of the invention, other portable communication terminals such as a PHS may be used for the purpose according to the present invention.

Although a description has been given of a case where the vibrator 725 is used to inform an incoming call by vibration as the incoming call notifying device, an incoming call notifying device for notifying an incoming call by means of voice such as an alarm may also be used likewise.

As described above, the incoming call notifying device shown in FIGS. 17–19 is such that since the open face of the loop and the surface of the grounded board are set parallel to each other and since the open area of the loop is substantially equal to or greater than that of the grounded board, the gain obtained from the open area of the loop is more improved than what is obtained from the loop heretofore disposed in a direction perpendicular to a grounded board. Moreover, the loop is not allowed to cross the grounded board unlike the conventional arrangement as the distance between the loop and the grounded board is set not less than 1/40 and besides the gain and the characteristics are respectively prevented from deteriorating and varying as the parts on the board can be separated from the loop.

As described above, it has been proposed to make the incoming call notifying device perform various operations by transmitting the weak radio wave from the portable telephone even when the portable telephone is on standby in the incoming call device for notifying the user about an incoming call upon receipt of the incoming call directed to the portable telephone. However, the use of such a weak radio wave which is allowed to be used even on standby according to the Radio Law may cause the weak radio wave to deviate from the standards provided for portable telephones.

The problem in that case is that portable telephones are unable to perform various operations for different purposed because of numerous standards of portable telephones.

On the other hand, the use of weak radio waves allowed to be used on receipt of incoming calls in various standards of portable telephones make it difficult for incoming call notifying devices to receive weak radio waves from portable communication terminals because outputs of allowable weak radio waves according to the Radio Law are low.

A description will subsequently be given of an incoming call notifying system of the portable communication terminal in that the function and utility value of the incoming call notifying device are improvable to ensure that the incoming call notifying operation and many other operations are performed reference to FIGS. 20–24.

As shown in FIG. 1 previously, the portable telephone 110 has the antenna 112 for carrying out communication with the base station 115 via radio, the mainframe circuit 114 for demodulating the signal transmitted from the base station 115 via the antenna 112, and the control unit 116 for causing the portable telephone 110 to perform its communication functions by controlling the respective parts of the portable telephone 110, the control unit 116 being connected to the mainframe circuit 114.

The portable telephone 110 has the remote control function for driving the vibrator 125 carried by the user via radio. More specifically, the vibrator communication circuit 118 is connected to the control unit 116 and so controlled by the control unit 116 as to transmit the ID signal subjected to processing such as high-frequency generation, high-frequency amplification and modulation from the remote control antenna 120 over the weak radio wave to the vibrator 125.

Upon receipt of the weak radio wave from the remote control antenna 120 of the portable telephone 110 via the high-sensitive antenna 127, the vibrator 125 subjects the transmitted ID signal to high-frequency amplification using the high-frequency amplifier circuit 129 and interprets the ID signal detected by the data detection circuit 131, which starts the rotation of the motor 133 as a drive source for performing the operation of vibrating the vibrator 125.

With the portable telephone 110 and the vibrator 125 thus arranged, the portable telephone 110 notifies the vibrator 125 about an incoming call from the base station 115 by transmitting the ID signal over the weak radio wave to the vibrator 125 when the portable telephone 110 decides that it has received the call from the base station 115 over the radio.

With this decision, the vibrator 125 causes itself to totally vibrate by rotating the motor 133 so as to notify the user about the incoming call directed to the portable telephone 110. It is therefore ensured that even when the portable telephone 110 is put in a bag or placed somewhere separately from the body, the incoming call notifying operation for notifying the user about the incoming call directed to the portable telephone 110 as long as the user carries or hold the vibrator 125 to the extent he is able to sense its vibration.

Figure 20:
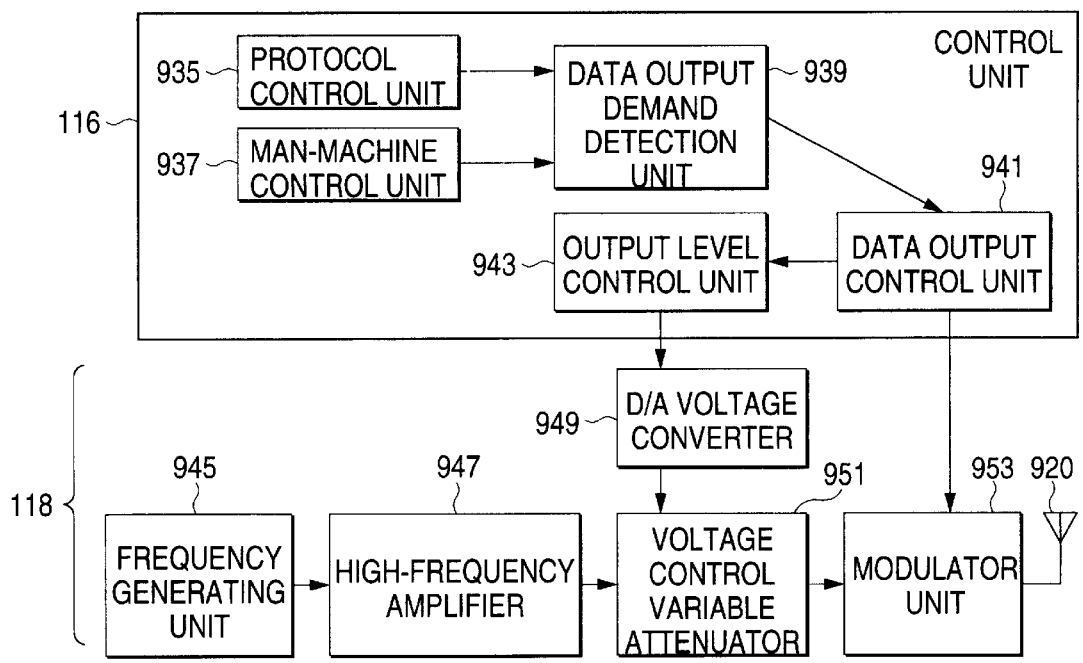
FIG. 20 is a block diagram of a control unit and a vibrator communication circuit constituting a portable telephone.

Such a portable telephone 110 will be described by reference to FIG. 20. FIG. 20 is a diagram mainly illustrating the control unit 116 and the vibrator communication circuit 118 in detail. The control unit 116 has a protocol control unit 935, a man-machine control unit 937, a data output demand detection unit 939, a data output control unit 941 and an output level control unit 943.

Further, the grounded portion 844 has a frequency generating unit 945, a high-frequency amplifier 947, a digital-analog voltage converter (D/A converter) 949, a voltage control type variable attenuator 951 and a modulator unit 953. The frequency generating unit 945 is a circuit for generating a specific frequency for use as an ID signal.

The principal function of the data output demand detection unit 939 in the control unit 116 is to monitor an incoming call receiving condition, a standby condition and the like. More specifically, the protocol control unit 935 notifies the data output demand detection unit 939 about the incoming call and the man-machine control unit 937 notifies the data output demand detection unit 939 about vibrating the vibrator 125 in the standby condition other than the incoming call receiving condition.

When the data output demand detection unit 939 is notifies of any one of the conditions above and detects a demand, the data output demand detection unit 939 inputs to the data output control unit 941 a data output demand signal corresponding to the demand. When the data output demand detection unit 939 detects a demand for stopping the vibration of the vibrator 125 as the user responds to the incoming call received by the portable telephone 110, the data output demand detection unit 939 inputs a stop signal to the data output control unit 941 and demands to stop data outputting.

The protocol control unit 935 is a circuit for controlling a call for speech and the like, and the man-machine control unit 937 is a circuit for controlling a user-interface signal concerning operations, display, voice and the like.

The data output control unit 941 functions as what starts the output level control unit 943 when receives an output demand from the data output demand detection unit 939, and supplies transmission data to the modulator unit 953. When the data output control unit 941 detects a data stop demand or at transmission time-out, the data output control unit 941 stops the operation of the output level control unit 943 and also stops supplying transmission data to the modulator unit 953.

Although the data output control unit 941 continues sending out the transmission data until it detects the stop demand when the incoming call is received. However, the data output control unit 941 sends out the transmission data for a predetermined time when the vibrator 125 is vibrated for different purposes in the standby condition other than the incoming call receiving condition and with the passage of the predetermined time, time-out is effected.

The output level control unit 943 functions as what controls an output level so that a high level (H level) is set when the output level control unit 943 detects a start demand from the data output control unit 941 and when it detects the output demand made by the protocol control unit 935.

The output level control unit 943 also functions as what controls the output level so that a low level (L level) is set when the output level control unit 943 detects the output demand made by the man-machine control unit 937 instead of the output demand made by the protocol control unit 935 in the above case.

Further, the output level control unit 943 stops the control operation when it detects a control stop demand from the data output control unit 941.

Figure 21:
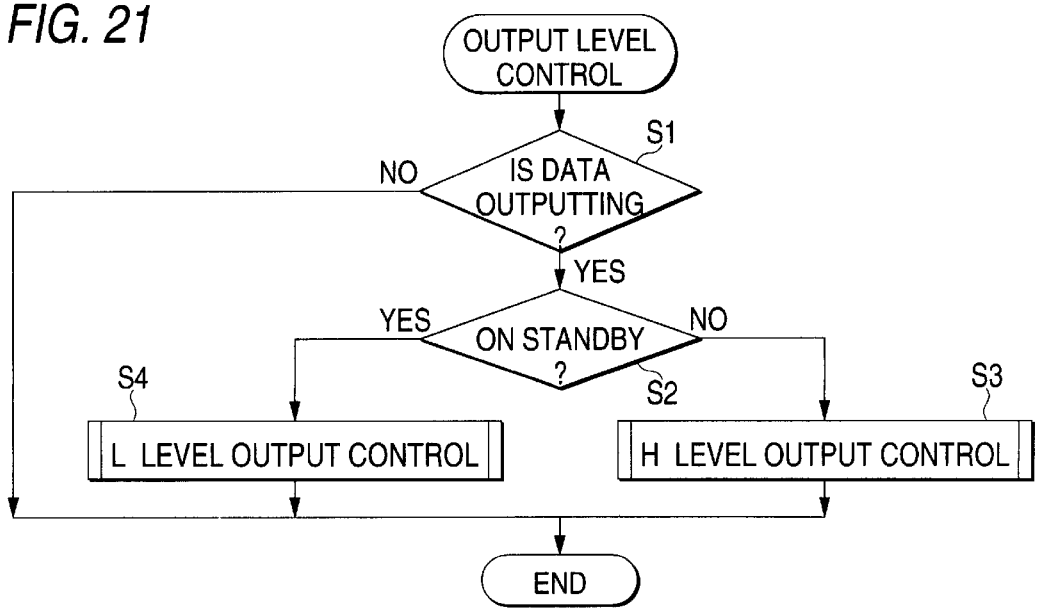
FIG. 21 is a flowchart showing control procedure in the operation of the portable telephone.

A description will subsequently be given of the operation of the portable telephone 110 by reference to a flowchart of FIG. 21.

When the output level control unit 943 detects a demand for starting output level control from the data output control unit 941, the output level control unit 943 starts the output level control operation and decides whether the data output control unit 941 is supplying the transmission data to the modulator unit 953 (Step S1).

If NO at Step S1, the process is terminated and if YES, the output level control unit 943 subsequently detects the presence or absence of an incoming call output from protocol control unit 935 and decides whether the portable telephone 110 is on standby (Step S2).

If NO at Step S2, the output level control unit 943 effects output control so that the weak radio wave from the remote control antenna 120 has the H level as ID signal transmission data notifying the incoming call is fed to the vibrator 125 (Step S3). The H-level weak radio wave is thus used on receipt of the incoming call to ensure that the vibrator 125 receives the transmission data from the portable telephone 110.

If YES at Step S2, that is, in the standby condition other than the incoming call receiving condition, the output level control unit 943 effects output control so that the weak radio wave from the remote control antenna 120 has the L level (Step S4). Since the vibrator 125 is considered easy to receive the radio wave with respect to the portable telephone 110 in the standby condition as compared with the incoming call receiving condition, the vibrator 125 is capable of readily receiving even the L-level weak radio wave.

Figure 22:
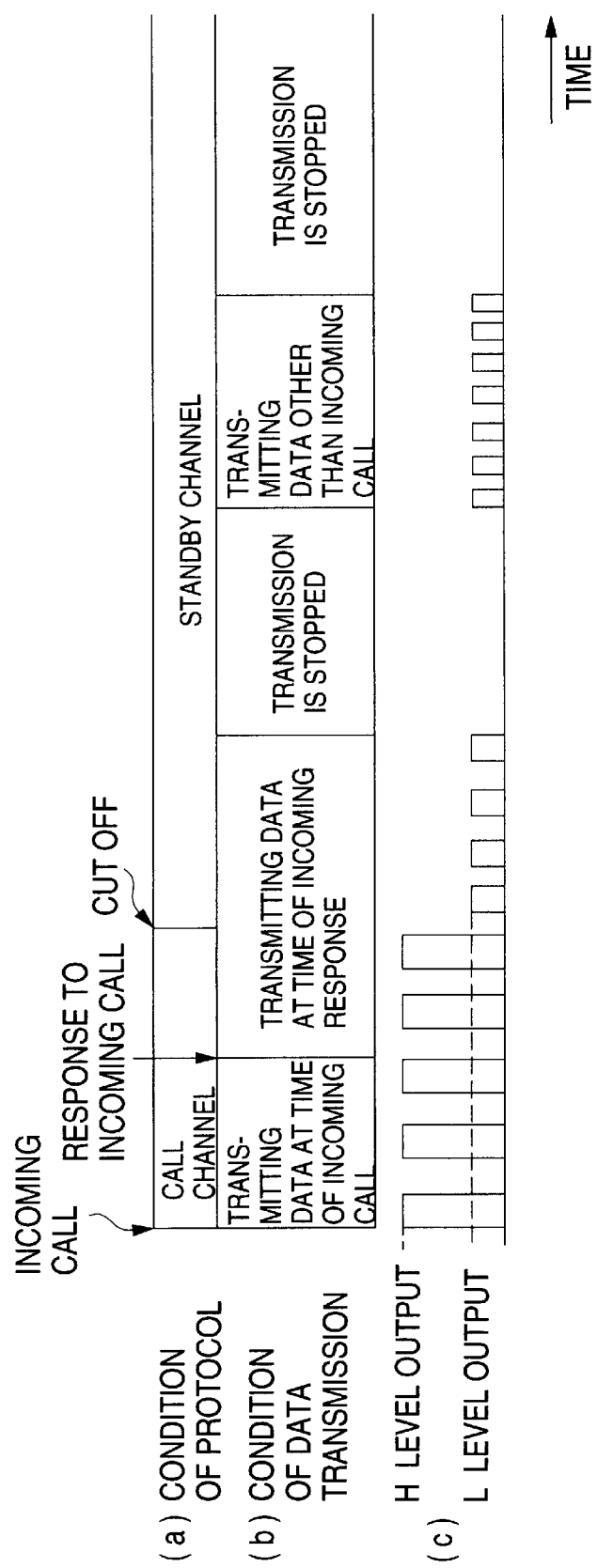
FIG. 22 is a time chart showing an example of the operation of the portable telephone.

FIG. 22 is a time chart showing the operation of the portable telephone 110. When the incoming call is received by the portable telephone 110, the portable telephone 110 sends the ID signal data at the time of incoming to the vibrator 125 to cause the vibrator 125 to vibrate. At this time, the portable telephone 110 outputs the H-level weak radio wave.

When the user responds to the incoming call (incoming response) because of the vibration of the vibrator 125, the portable telephone 110 sends data (data at the time of incoming response) for stopping the vibration (the motor 133) to the vibrator 125. If a conversation is kept on then, the H-level weak radio wave is output.

As shown in FIG. 22, however, a call channel is switched over a standby channel halfway when the conversation is terminated and cut off (end of conversation) while the data at the time of incoming response is being sent out, whereby the data at the time of incoming response is switched from the H level to L level halfway.

When the motor 133 of the vibrator 125 is stopped then, the outputting of the weak radio wave from the portable telephone 110 to the vibrator 125 is also stopped. However, the L-level weak radio wave is output from the portable telephone 110 to the vibrator 125 when the vibrator 125 is vibrated through the standby channel for the purposes different from the reception of an incoming call.

The data transmission from the portable telephone 110 to the vibrator 125 is stopped after the object is accomplished by vibrating the vibrator 125 and data transmission at the time of incoming or for any purpose other than the reception of an incoming call is waited for.

There are cases where the vibrator 125 is desired to be vibrated for purposes different from the reception of an incoming call as follows:

(a) When the ID number of the vibrator 125 is set on the side of the portable telephone 110, the vibrator 125 is vibrated for about three seconds to inform the user that the ID number has been set properly.

(b) When the user changed the vibration pattern of the vibrator 125 at the time of incoming through the altering operation from the side of the portable telephone 110, the vibrator 125 is vibrated for about three seconds to inform the user about the way the vibrator 125 vibrates.

(c) While the function of the vibrator 125 is held ON (standby condition with the power supply kept ON), the vibrator 125 is vibrated for about 0.5 second to inform the user that the battery of the vibrator 125 still has a reserve of power by turning ON and OFF the power supply of the portable telephone 110. If the balance of the battery is nil, the vibrator 125 will not vibrate.

Figure 23:
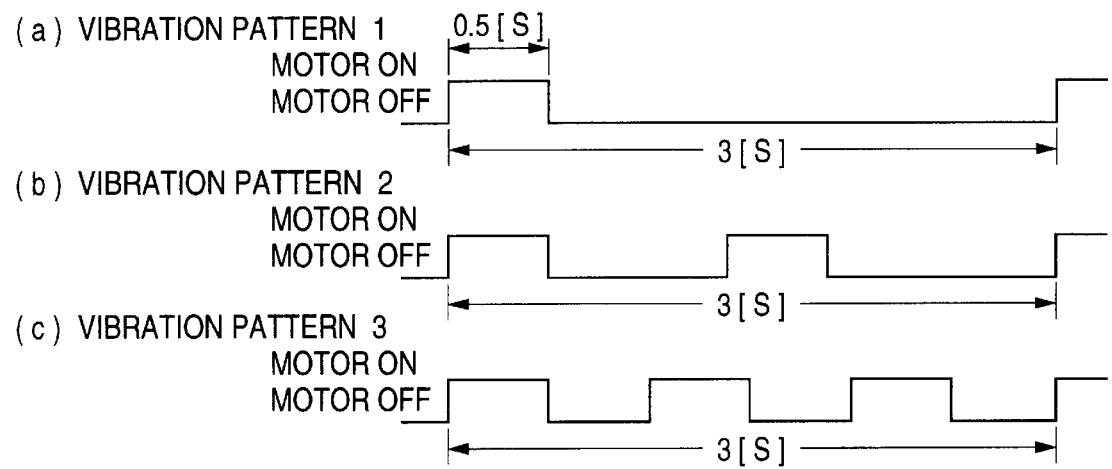
FIG. 23 is a waveform chart showing an example of a vibration pattern in the portable telephone: (a) a waveform chart showing a vibration pattern 1; (b) a waveform chart showing a vibration pattern 2; and (c) a waveform chart showing a vibration pattern 3.

There may be vibration patterns of the vibrator 125 as shown in FIG. 23.

The vibration pattern 1 shown in FIG. 23(a) is such that the motor 133 is turned ON for 0.5 second each time in a 3-second cycle to vibrate the vibrator 125; the vibration pattern 2 shown in FIG. 23(b) is such that the motor 133 is turned ON for 0.5 second twice in a 3-second cycle; and the vibration pattern 3 shown in FIG. 23(c) is such that the motor 133 is turned ON for 0.5 second three times in a 3-second cycle.

Figure 24:
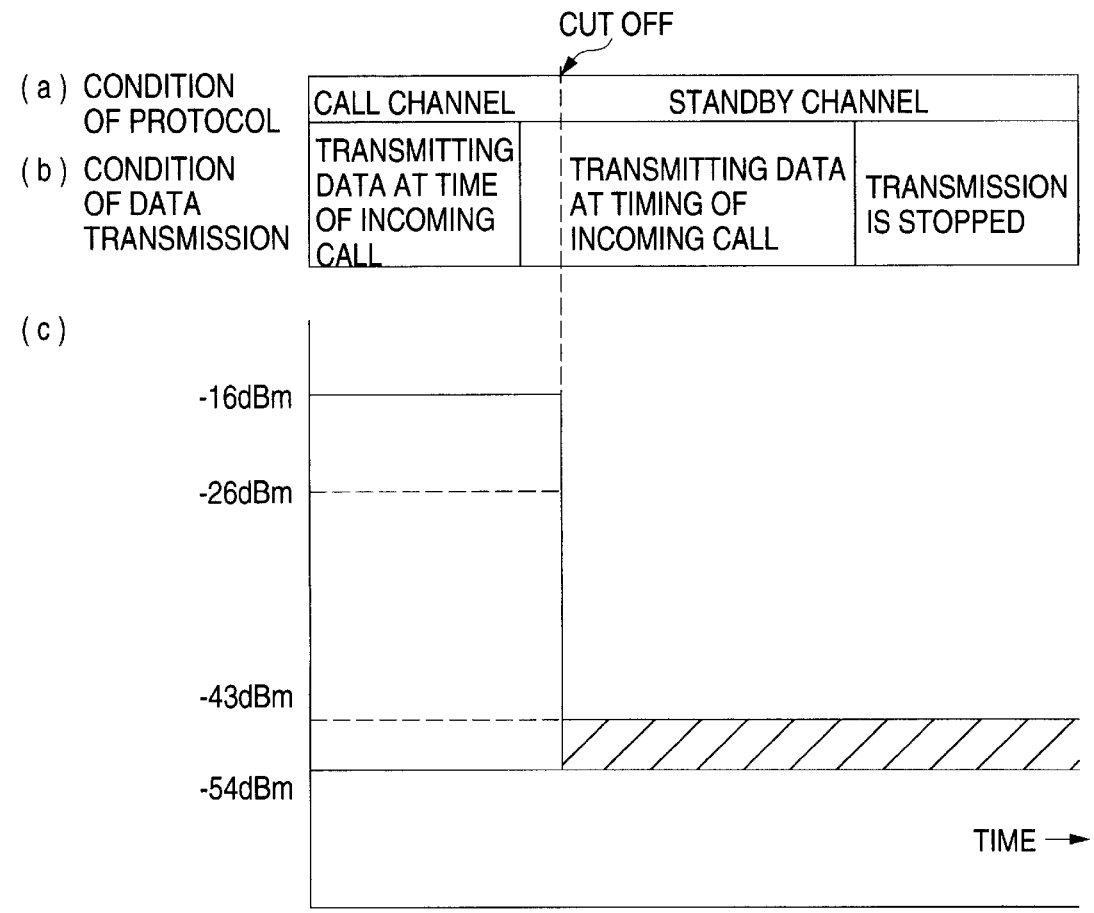
FIG. 24 is a diagram illustrating difference in the output levels of weak radio waves output by the portable telephone in terms of specific values on a standard basis corresponding to the time chart of FIG. 22.
Figure 25:
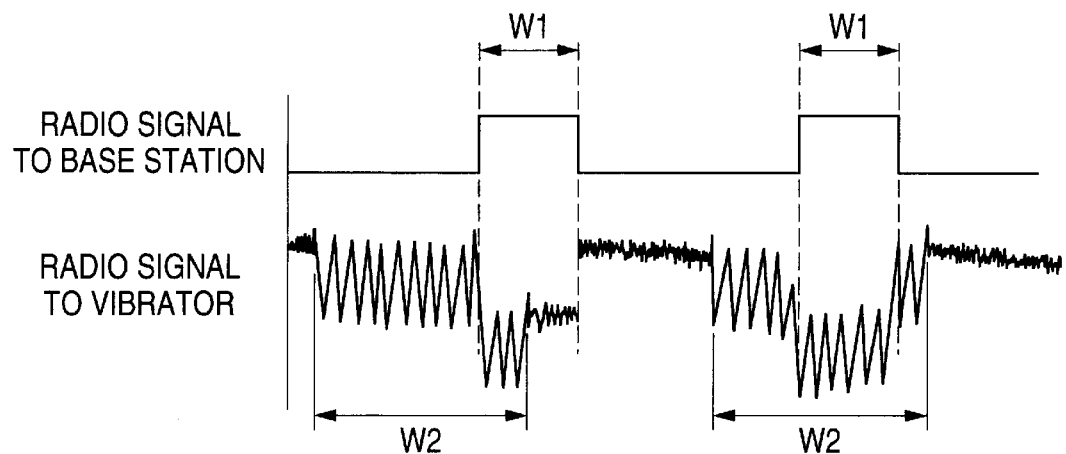
FIG. 25 is a diagram illustrating a state in which a radio signal from a portable telephone to a vibrator is jammed by a radio signal from the portable telephone to a base station as deemed problematical in the prior art.
Figure 26:
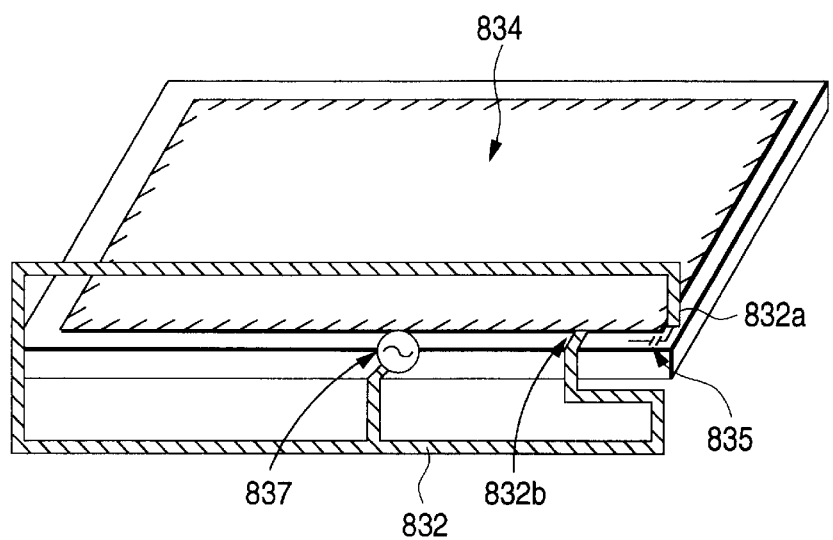
FIG. 26 is a perspective view of a conventional loop antenna.
Figure 27:
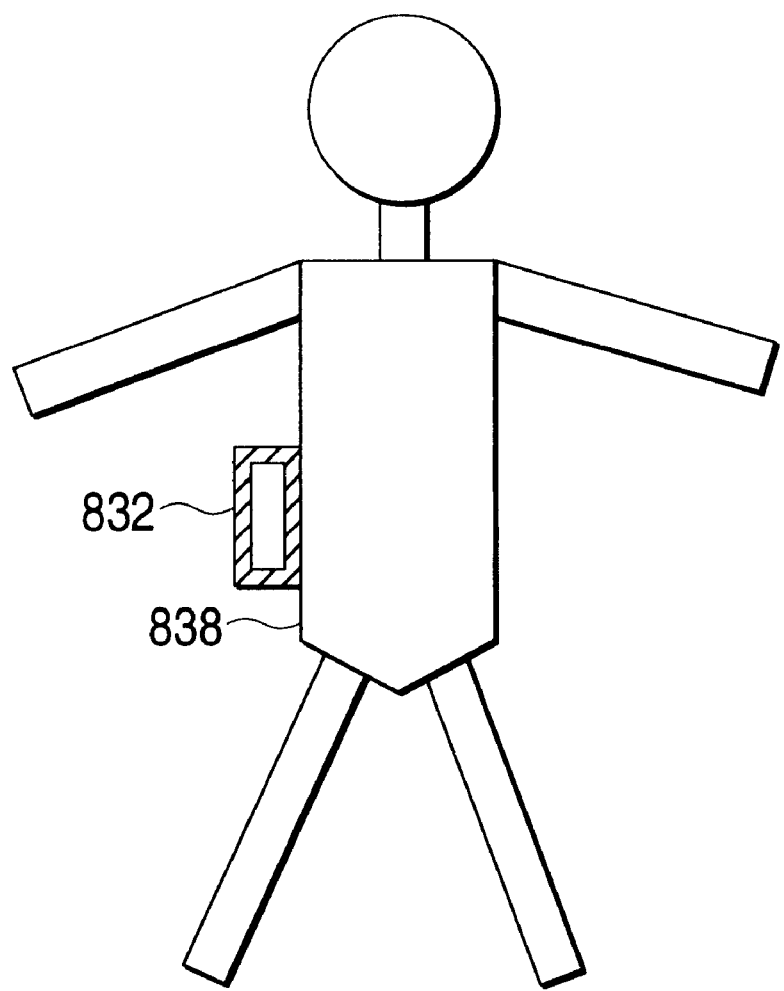
FIG. 27 is a schematic diagram illustrating a conventional antenna fitted to the side face of the human body.

FIG. 24 shows specific values by different standards corresponding to the time chart of FIG. 22, which values represent different output levels of weak radio waves that the portable telephone 110 outputs. The H-level weak radio wave that is output from the portable telephone 110 to the vibrator 125 through the call channel is, as shown by a solid line of FIG. 24(c), not greater than −16 dBm as provided for in the Radio Law.

The L-level weak radio wave that is output from the portable telephone 110 to the vibrator 125 through the standby channel is, as shown by a solid line of FIG. 24(c), not greater than −54 dBm as stipulated by various standards, for example, RCR-STD27.

The use of allowable weak radio waves of −43 dBm or less through the standby channel according to the Radio Law makes it impossible to vibrate the vibrator 125 in various modes on the basis of the RCR-STD27 standard because the RCR-STD27 standard is not satisfied (substandard). The substandard like this is brought about in the range of −43 dBm to −54 dBm as shown by slant lines of FIG. 24.

According to the RCR-STD27 standard, a weak radio wave of −26 dBm may be used through the call channel as shown by a broken line of FIG. 24(c).

The vibration patterns of the vibrator 125 are needless to say limited to those shown in FIGS. 23(a)–(c).

As described above, the incoming call notifying system of the portable communication terminal shown in FIGS. 20–24 is arranged so that the incoming call notifying device may perform various operations for purposes other than notifying the user about the incoming call so as to increase the function and utility value of the incoming call notifying device since the incoming call notifying device is allowed to receive the weak radio wave from the portable communication terminal even in the standby condition other than the incoming call receiving condition.

The output level of the weak radio wave is set to the high level when the incoming call is received by the portable communication terminal to ensure that the weak radio wave from the portable communication terminal is received by the incoming call notifying device.

On the other hand, the weak radio wave from the portable communication terminal is prevented from deviating from the various standards of the portable telephone by setting the output level to the low level even in the standby condition to ensure that the incoming call notifying device is allowed to perform operations for purposes other than notifying the user about the incoming call.

What is claimed is:

1. A communication system of a portable communication terminal comprising:
   a portable communication terminal capable of movably communicating with another communication terminal via radio communication with a base station, and
   peripheral equipment which performs a predetermined operation via radio communication with the portable communication terminal, wherein the portable communication terminal transmits a radio signal to the peripheral equipment by using a time division multiplex access system for exchanging signals by putting data on a time slot as the radio communication between the portable communication terminal and the peripheral equipment and using the time slot in a time zone excluding other time zones in which the portable communication terminal is transmitting a radio signal to the base station.

2. A communication system of a portable communication terminal as claimed in claim 1, wherein an incoming call notifying device is used for the peripheral equipment; and when an incoming call signal is input to the portable communication terminal from the base station, the portable communication terminal transmits a radio signal to the incoming call notifying device so as to make the incoming call notifying device perform an incoming call notifying operation.

3. A communication system of a portable communication terminal as claimed in claim 1, wherein the data length of a time slot to the peripheral equipment is equalized in any one of cases where the time slot is in either full-rate mode or half-rate mode.

4. A communication system of a portable communication terminal as claimed in claim 2, wherein the portable communication terminal transmits to the incoming call notifying device an incoming call signal and an ID signal characteristic of the incoming call signal; the incoming call notifying device decides whether the ID signal conforms to the data stored in an intrinsic memory; and when the ID signal and the data conform to each other, the incoming call notifying device performs an incoming call notifying operation.

5. An incoming call control system of a portable communication terminal comprising a portable communication terminal body and an incoming call device for notifying a user about an incoming call, wherein the portable communication terminal body is provided with a first transmission unit for communicating with a base station via a first radio wave and a second transmission unit for communicating with the incoming call device, the second transmission unit being capable of transmitting a second radio wave other than the first radio wave; wherein the second radio wave is used to transmit an ID code from the portable communication terminal body to the incoming call device which compares the ID code with an ID code stored in the incoming call device; and wherein the user is notified of an incoming call only when the ID code transmitted from the portable communication terminal body conforms to the ID code stored in the incoming call device.

6. An incoming call control system of a portable communication terminal as claimed in claim 5, wherein the ID code is set in the incoming call device by transmitting the ID code set on the side of the portable communication terminal via radio to the incoming call device through a ten-key keyboard of the portable communication terminal body.

7. An incoming call control system of a portable communication terminal as claimed in claim 5, wherein the ID code is writable to the storage device of the incoming call device by connecting a signal line to an external device.

8. An incoming call control system of a portable communication terminal as claimed in claim 5, wherein incoming call transmission means on the portable communication terminal side comprises at least an antenna, a modulator for transmitting an incoming call identifying signal through pulse modulation, a crystal oscillator, control means and a memory; reception means on the incoming call device side comprises at least an antenna, a high-frequency amplifier circuit for amplifying the signal transmitted through the pulse modulation, a superregenerative detection circuit for detecting the amplified signal, a filter, control means, a memory and a motor, whereby an incoming call is transmitted to the portable communication terminal side.

9. An incoming call control system of a portable communication terminal, comprising an incoming call notifying device, wherein when an incoming call is received by the portable communication terminal, an ID signal is transmitted from the portable communication terminal via radio to the incoming call notifying device; and the incoming call notifying device performs an incoming call notifying operation after the incoming call notifying device detects the ID signal transmitted by the portable communication terminal, wherein a data format of the ID signal transmitted from the portable communication terminal to the incoming call notifying device has a bit synchronizing frame for use in clock regeneration by the incoming call notifying device, a word synchronizing frame for use in frame synchronization for the acquisition of ID information, and an ID information frame for loading ID information stored in the portable communication terminal.

10. An incoming call control system of a portable communication terminal as claimed in claim 9, wherein the data format is provided with an operating mode frame having operating mode information designated by the portable communication terminal next to the ID information frame.

11. An incoming call control system of a portable communication terminal as claimed in claim 10, wherein the data format is provided with a parity frame for detecting a code error next to the operating mode frame.

12. An incoming call control system of a portable communication terminal as claimed in one of claims 9–11, wherein the portable communication terminal transmits a full-rate mode signal which has been coded into a half-rate mode signal; and the incoming call notifying device demodulates the received half-rate mode signal into the full-rate mode signal.

13. An incoming call control system of a portable communication terminal as claimed in one of claims 9–11, wherein the portable communication terminal employs an ASK digital signal modulation system for modulation.

14. An incoming call control system of a portable communication terminal as claimed in one of claims 9–11, wherein the ID signal is transmitted at a transmission rate of 400 bps with a data length of 80 ms.

15. An incoming call control system of a portable communication terminal wherein when an incoming call is received by a portable communication terminal, an ID signal is transmitted from the portable communication terminal via radio to an incoming call notifying device; and the incoming call notifying device performs an incoming call notifying operation after the portable communication terminal detects the ID signal, wherein weak radio waves in the frequency range of 250 MHz to 322 MHz are used for the ID signal.

16. An incoming call control system of a portable communication terminal as claimed in claim 15, wherein the incoming call notifying device is provided with a built-in loop antenna for receiving the weak radio wave.

17. An incoming call notifying device of a portable communication terminal wherein when an incoming call is received by the portable communication terminal, an ID signal is transmitted from the portable communication terminal via radio to an incoming call notifying device; and the incoming call notifying device performs an incoming call notifying operation after the incoming call notifying device detect the ID signal on receipt of the ID signal intermittently, wherein the incoming call notifying device is provided with a received data detection unit for detecting a digital data on receipt of a radio wave from the portable communication terminal, a control unit for comparing the ID data detected by the received data detection unit with the data prestored in a memory so as to control the incoming call notifying device on the basis of results of comparison and identifying the data detected by the received data detection unit stepwise before controlling the incoming call notifying device, a timer for outputting a transfer signal for switching the received data detection unit from a sleep mode to an operating mode in a predetermined cycle, wherein when the timer outputs the transfer signal, the control unit switches the received data detection unit from the sleep mode to the operating mode and identifies the data detected by the received data detection unit stepwise and when the data needs not detection, the control unit returns the received data detection unit to the sleep mode from the operating mode.

18. An incoming call control system of a portable communication terminal as claimed in claim 17, wherein when the control unit decides that the received data is doubtful, the control unit immediately returns the received data detection unit to the sleep mode from the operating mode.

19. An incoming call notifying device of a portable communication terminal as claimed in either claim 17 or claim 18, wherein when the control unit fails to identify the bit synchronizing data of the received data, the control unit immediately returns the received data detection unit to the sleep mode from the operating mode.

20. An incoming call notifying device of a portable communication terminal as claimed in one of claims 17–18, wherein when the control unit fails to identify the bit synchronizing data of the received data, the control unit exerts control so that the received data detection unit is immediately returned to the sleep mode from the operating mode.

21. An incoming call notifying device of a portable communication terminal as claimed in one of claims 17–18, wherein when the control unit decides that the ID information of the received data is different from the prestored ID data, the control unit exerts control so that the received data detection unit is immediately returned to the sleep mode from the operating mode.

22. An incoming call notifying device of a portable communication terminal wherein when an incoming call is received by a portable communication terminal, an ID signal is transmitted from the portable communication terminal via radio to the data reception unit of the incoming call notifying device; and the incoming call notifying device performs an incoming call notifying operation after detection of the ID signal, characterized in that an antenna for use is such that the open f ace of a loop and the surface of a grounded board are set parallel to each other; the open area of the loop is set equal to or greater than the area of the grounded board; and the distance between the loop and the grounded board is set not less than $1/40$ of the wavelength.

* * * * *